US009065494B2

(12) United States Patent
Nammi et al.

(10) Patent No.: US 9,065,494 B2
(45) Date of Patent: Jun. 23, 2015

(54) METHODS FOR SELECTING PRECODING VECTORS FOR MULTI-POINT MIMO (MULTIPLE-INPUT-MULTIPLE-OUTPUT) COMMUNICATIONS AND RELATED WIRELESS TERMINALS AND RADIO NETWORK NODES

(71) Applicant: Telefonaktiebolaget L M Ericsson, Stockholm (SE)

(72) Inventors: Sairamesh Nammi, Stockholm (SE); Qingyu Miao, Beijing (CN); Peter von Wrycza, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/818,161

(22) PCT Filed: Jan. 15, 2013

(86) PCT No.: PCT/SE2013/050022
§ 371 (c)(1),
(2) Date: Feb. 21, 2013

(87) PCT Pub. No.: WO2013/112097
PCT Pub. Date: Aug. 1, 2013

(65) Prior Publication Data
US 2014/0161203 A1 Jun. 12, 2014

Related U.S. Application Data

(60) Provisional application No. 61/591,307, filed on Jan. 27, 2012.

(51) Int. Cl.
*H04B 7/02* (2006.01)
*H04B 7/04* (2006.01)
*H04B 7/06* (2006.01)

(52) U.S. Cl.
CPC .............. *H04B 7/024* (2013.01); *H04B 7/0495* (2013.01); *H04B 7/0639* (2013.01); *H04B 7/046* (2013.01); *H04B 7/0486* (2013.01)

(58) Field of Classification Search
None
See application file for complete search history.

(56) References Cited

U.S. PATENT DOCUMENTS

2007/0041464 A1\* 2/2007 Kim et al. ..................... 375/267
2011/0081901 A1\* 4/2011 Moulsley et al. .......... 455/422.1

FOREIGN PATENT DOCUMENTS

EP          2 194 740 A1     6/2010
WO     WO 2009/134357 A1   11/2009

(Continued)

OTHER PUBLICATIONS

QUALCOMM Incorporated, "MIMO in MP-HSDPA", 3GPP TSG RAN WG1 Meeting #67, R1-114016; San Francisco, CA, Nov. 14-18, 2011, 8pp.

(Continued)

*Primary Examiner* — Adolf Dsouza
(74) *Attorney, Agent, or Firm* — Myers Bigel Sibley & Sajovec, P.A.

(57) ABSTRACT

A wireless terminal may receive multiple-input-multiple-output (MIMO) downlink communications from a wireless communication network including a plurality of base station sector antenna arrays using a codebook of precoding vectors. MIMO downlink communications may be received from the wireless communication. When receiving the MIMO downlink communications as multi-point MIMO downlink communications from first and second base station sector antenna arrays of the plurality of base station sector antenna arrays, a precoding vector may be selected for the multi-point MIMO downlink communications from only a subset of the precoding vectors of the codebook.

16 Claims, 22 Drawing Sheets

(56) References Cited

FOREIGN PATENT DOCUMENTS

| WO | WO 2011/021861 A2 | 2/2011 |
| WO | WO 2012/095188 A1 | 7/2012 |

OTHER PUBLICATIONS

Nokia Siemens Networks, Nokia, "Performance of Multiflow with single-stream MIMO", 3GPP TSG RAN WG1 Meeting #67, R1-114149; San Francisco, CA, Nov. 14-18, 2011, 10pp.

3rd Generation Partnership Project; "Technical Specification Group Radio Access Network"; 3GPP TS 25.214 V10.1.0 (Dec. 2010); Physical layer procedures (FDD); (Release 10); 99pp.

Nammi, et al., U.S. Appl. No. 13/328,139, filed Dec. 16, 2011.

I. Emre Telatar, "Capacity of Multi-antenna Gaussian Channels", Lucent Technologies, Bell Laboratories, Murray Hill, NJ, Oct. 1995; *European Transactions on Telecommunications*, vol. 1, No. 6, pp. 585-595, Nov./Dec. 1999.

International Searching Report, PCT/SE2013/050022, May 7, 2013.

Written Opinion of the International Searching Authority, PCT/SE2013/050022, May 7, 2013.

International Preliminary Report on Patentability corresponding to International Application No. PCT/SE2013/050022; Date of Issuance: Jul. 29, 2014; 8 Pages.

\* cited by examiner

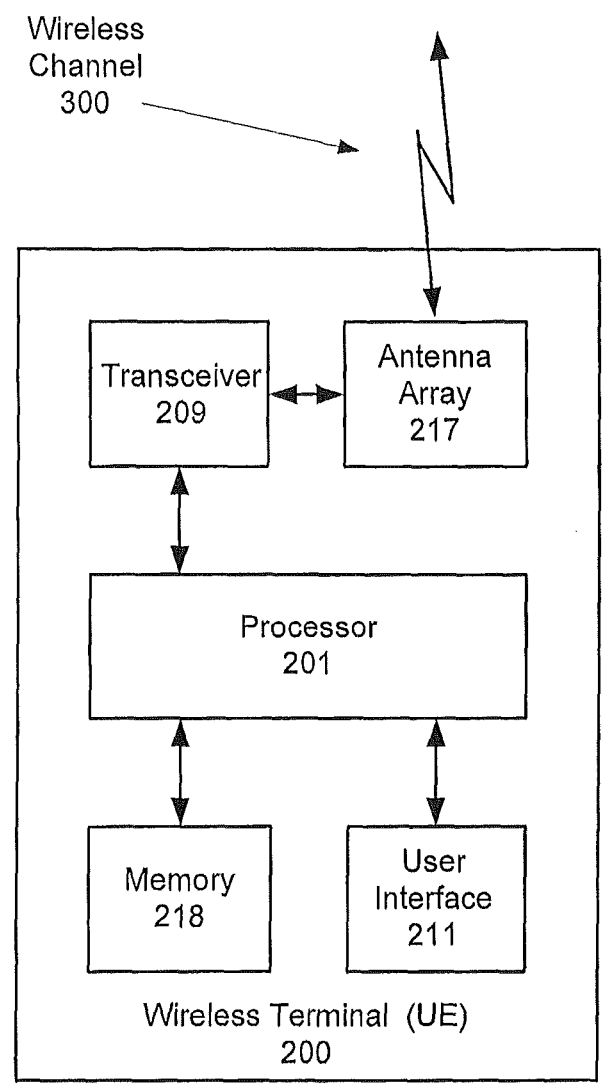

Figure 17A

| Parameters | Comments |
|---|---|
| Cell Layout | Hexagonal grid, 19 Node B, 3 sectors per Node B with wrap-around |
| Inter-site distance | 1000 m |
| Carrier Frequency | 2000 MHz |
| Path Loss | L=128.1 + 37.6log10(R), R in kilometers |
| Penetration loss | 10 dB |
| Log Normal Fading | Standard Deviation: 8dB  Inter-Node B Correlation:0.5  Intra-Node B Correlation :1.0 |
| Max BS Antenna Gain | 14 dBi |
| Antenna pattern | Mandatory: $$A(\theta) = -\min\left[12\left(\frac{\theta}{\theta_{3dB}}\right)^2, A_m\right]$$ = 70 degrees, $A_m$ = 20 dB |
| Number of UEs/cell | 1, 2, 4, 8, 16  UEs dropped uniformly across the system |

Figure 17B

| Parameters | Comments |
|---|---|
| Channel Model | PA3, VA3<br><br>Fading across all pairs of antennas is completely uncorrelated. |
| CPICH Ec/Io | -10 dB |
| Total Overhead power | 30% |
| UE Antenna Gain | 0 dBi |
| UE noise figure | 9 dB |
| Thermal noise density | -174 dBm/Hz |
| Maximum Sector Transmit Power | 43 dBm |
| Soft Handover Parameters | $R_{1a}$ (reporting range constant) = 3 dB,<br><br>$R_{1b}$ (reporting range constant) = 5 dB |

Figure 17C

| Parameters | Comments |
|---|---|
| HS-DSCH | Up to 15 SF 16 codes per carrier for HS-PDSCH<br><br>-Total available power for HS-PDSCH and HS-SCCH is 70% of Node B Tx power, with HS-SCCH transmit power being driven by 1% HS-SCCH BLER, or<br><br>HS-PDSCH HARQ: Both Chase combining and IR based can be used. Maximum of 4 transmissions with 10% target BLER after the first transmission. Retransmissions are of highest priority. |
| HS-DPCCH | Ideal |
| Number of H-ARQ processes | 6 |
| Maximum active set size | 3 |
| Traffic | Bursty Traffic Source Model<br><br>File Size: Truncated Lognormal; $\mu = 11,736$ $\sigma = 0.0$<br>Mean = 0.125 Mbytes<br>Maximum = 1.25 Mbytes<br><br>Inter-arrival time: Exponential, Mean = 5 seconds |
| OCNS | OCNS=0, namely all sectors transmit at full power only when they have data. |

Figure 17D

| Parameters | Comments |
|---|---|
| DL Scheduling | Round Robin |
| Number of MAC-ehs entities | One MAC-ehs entity at the UE. |
| RLC layer modeling | Ideal |
| Iub Flow control modeling | Ideal |
| HS-DPCCH Decoding | Ideal |
| MP-HSDPA UE capabilities | All MP-HSDPA UEs are capable of 15 SF 16 codes and 64QAM for each cell<br><br>Percentage of MP-HSDPA capable UEs : 100% |
| Legacy UE capabilities | Type 3i |
| UE distribution | UEs uniformly distributed within the system |
| Secondary serving cell | The secondary strongest cell in the UE active set, based on path loss and shadowing, is the secondary serving cell. For Intra-NB schemes, secondary serving HS-DSCH cell is further restricted to be at the same Node B as the primary serving cell |

Figure 18

| Load (Mean users per sector) | % of gain compared to SIMO | | | | | | |
|---|---|---|---|---|---|---|---|
| | Without MF | | | | With MF | | |
| | SIMO | MIMO-Rank-1 | MIMO | | SIMO | MIMO-Rank-1 | MIMO |
| 0.1 | - | 24 | 20.15 | | 21.05 | 49.55 | 39.41 |
| 0.5 | - | 27.81 | 20.49 | | 11.71 | 40.24 | 28.78 |
| 1 | - | 30.5 | 21.24 | | 9.27 | 38.61 | 26.25 |
| 2 | - | 29.86 | 18.06 | | 6.94 | 35.42 | 21.53 |

METHODS FOR SELECTING PRECODING VECTORS FOR MULTI-POINT MIMO (MULTIPLE-INPUT-MULTIPLE-OUTPUT) COMMUNICATIONS AND RELATED WIRELESS TERMINALS AND RADIO NETWORK NODES

CROSS REFERENCE TO RELATED APPLICATIONS

This application is a 35 U.S.C. §371 national stage application of PCT International Application No. PCT/SE2013/050022, filed on 15 Jan. 2013, which itself claims priority to U.S. Provisional Patent Application No. 61/591,307, filed 27Jan. 2012, the disclosure and content of both of which are incorporated by reference herein in their entirety.

TECHNICAL FIELD

The present disclosure is directed to wireless communications and, more particularly, to Multi-Point wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided input a plurality of sectors surrounding the base station. For example, a base station may service three 120 degree sectors surrounding the base station, and the base station may provide a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain. As used herein, the term time-frequency-resource-element (TFRE) may refer to a time-frequency-code-resource-element.

To further increase throughput at a sector/cell edge (also referred to as a soft handover or border area) using High Speed Downlink Packet Access (HSDPA), Multi-Point-HSDPA(MP-HSDPA, also referred to as multi-flow-HSDPA or MF-HSDPA) has been proposed for $3^{rd}$ Generation Partnership Project (3GPP) communications. In MP-HSDPA, transport blocks of a data stream may be transmitted from two different sectors/cells of the same or different base stations to a same wireless terminal in a border area between the sectors/cells. Intra Node-B aggregation (also referred to as intra node Multi-Point communications) occurs when different transport blocks of a data stream are transmitted from two different sectors of a same base station to a wireless terminal, and Inter Node-B aggregation (also referred to as inter node Multi-Point communications) occurs when different transport blocks of a data stream are transmitted from sectors of different base stations to a wireless terminal. MP-HSDPA may thus provide advantages of parallel data streams like MIMO where the spatially separated antennas are taken from different sectors/cells.

When MP-HSDPA is configured for transmission (from two cells/sectors of a same base station or from two cells/sectors of different base stations) to a MIMO capable wireless terminal with only two receive antennas, however, a maximum multiplex gain may be two (determined as the lesser of the number of transmitter antennas or receiver antennas used for the wireless link). Scheduling two streams with Multi-Point operation from the same sector/cell during Multi-Point communications from different sectors/cells may thus result in a loss in wireless terminal and/or sector throughput. Use of MP-HSDPA with two MIMO streams from the same sector/cell may not provide useful gains in throughput, and in fact, use of MP-HSDPA with two MIMO streams from the same sector/cell may result in a loss in sector throughput.

SUMMARY

It is therefore an object to address at least some of the above mentioned disadvantages and/or to improve performance in a wireless communication system.

According to some embodiments of present inventive concepts, a wireless terminal may receive multiple-input-multiple-output (MIMO) downlink communications from a wireless network including a plurality of base station sector antenna arrays using a codebook of precoding vectors. Responsive to receiving the MIMO downlink communications as multi-point MIMO downlink communications from first and second base station sector antenna arrays of the plurality of base station sector antenna arrays, a precoding vector may be selected for the multi-point MIMO downlink communications from only a subset of the precoding vectors of the codebook. Stated in other words, selection of the precoding vector may be restricted to only the subset of the precoding vectors during multi-point downlink communications.

Responsive to receiving the MIMO downlink communications as single-point MIMO downlink communications from only one base station sector antenna array, a precoding vector may be selected for the single-point MIMO downlink communications from any of the precoding vectors of the codebook. During single-point MIMO communications, the precoding vector may be selected without restriction.

According to some other embodiments, a wireless communication network including a plurality of base station sector antenna arrays may provide multiple-input-multiple-output (MIMO) downlink communications using a codebook of precoding vectors. A node of the network may transmit MIMO downlink communications from the wireless communication network to a wireless terminal. Responsive to transmitting the MIMO downlink communications as multi-point MIMO downlink communications from first and second base station sector antenna arrays of the plurality of base station sector antenna arrays to the wireless terminal, a precoding vector may be selected for the multi-point MIMO downlink communications from only a subset of the precoding vectors of the codebook. Stated in other words, selection of the precoding vector may be restricted to only the subset of the precoding vectors during multi-point downlink communications.

Responsive to transmitting the MIMO downlink communications as single-point MIMO downlink communications from only one base station sector antenna array, a precoding vector may be selected for the single-point MIMO downlink communications from any of the precoding vectors of the codebook. During single-point MIMO communications, the precoding vector may be selected without restriction.

According to still other embodiments, a wireless terminal may include an antenna array, a transceiver coupled to the antenna array, and a processor coupled to the transceiver. The antenna array may include a plurality of multiple-input-multiple-output(MIMO) antenna elements, and the transceiver may be configured to receive MIMO downlink communications through the antenna array from at least one of a plurality of base station sector antenna arrays of a wireless network using a codebook of precoding vectors. The processor may be configured to select a precoding vector for downlink communications from only a subset of the precoding vectors of the codebook responsive to receiving the MIMO downlink communications as multi-point MIMO downlink communications from first and second base station sector antenna arrays.

According to yet other embodiments, a wireless communication network node may provide multiple-input-multiple-output (MIMO) downlink communications. The node may include first and second sector antenna arrays for different sectors of the node, with each of the first and second sector antenna arrays including a plurality of MIMO antenna elements. A first transceiver may be coupled to the first sector antenna array, and the first transceiver may be configured to transmit MIMO downlink communications through the first sector antenna array using a codebook of precoding vectors. A second transceiver may be coupled to the second sector antenna array, and the second transceiver may be configured to transmit MIMO downlink communications through the second sector antenna array using the codebook of precoding vectors. A processor may be coupled to the first and second transceivers, and the processor may be configured to transmit MIMO downlink communications through the first and/or second transceivers and the first and/or second sector antenna arrays to a wireless terminal. The processor may be further configured to select a precoding vector from only a subset of the precoding vectors of the codebook responsive to transmitting the MIMO downlink communications to the wireless terminal as multi-point MIMO downlink communications from the first and second sector antenna arrays.

By restricting selection of precoding vectors to only Rank 1 precoding vectors when the wireless terminal is receiving multi-point downlink transmissions from different sector antenna arrays of the radio access network, performance may be improved by preventing spatial multiplexing of downlink transmissions from any sector antenna array to a wireless terminal currently receiving multi-point downlink transmissions. Even though a channel quality between the wireless terminal and a sector antenna arrays providing multi-point downlink transmissions may be of sufficient quality to support spatial multiplexing, such spatial multiplexing may be incompatible with multi-point operations, and selection from only Rank 1 precoding vectors may be forced to prevent such spatial multiplexing from a sector antenna array to a wireless terminal receiving multi-point downlink transmissions. In contrast, any precoding vector of Rank 1 or higher may be selected when the wireless terminal is receiving single-point MIMO downlink transmissions from only one sector antenna array, and spatial multiplexing from a sector antenna array may be allowed for single-point MIMO downlink transmissions.

BRIEF DESCRIPTION OF THE DRAWINGS

The accompanying drawings, which are included to provide a further understanding of the disclosure and are incorporated in and constitute a part of this application, illustrate certain non-limiting embodiment(s) of present inventive concepts. In the drawings:

FIGS. 2A, 2B, 2C, and 2D are block diagrams respectively illustrating a base station, a base station controller, a radio network controller, and a wireless terminal according to some embodiments of FIGS. 1A and/or 1B;

FIGS. 17A, 17B, 17C, and 17D are tables of system level simulation parameters according to some embodiments; and FIG. 18 is a table illustrating relative simulated gains compared to baseline (SIMO with MF) for PA3 channel where these values correspond to only softer/soft handover users per sector according to some embodiments.

DETAILED DESCRIPTION

Figure 1A:
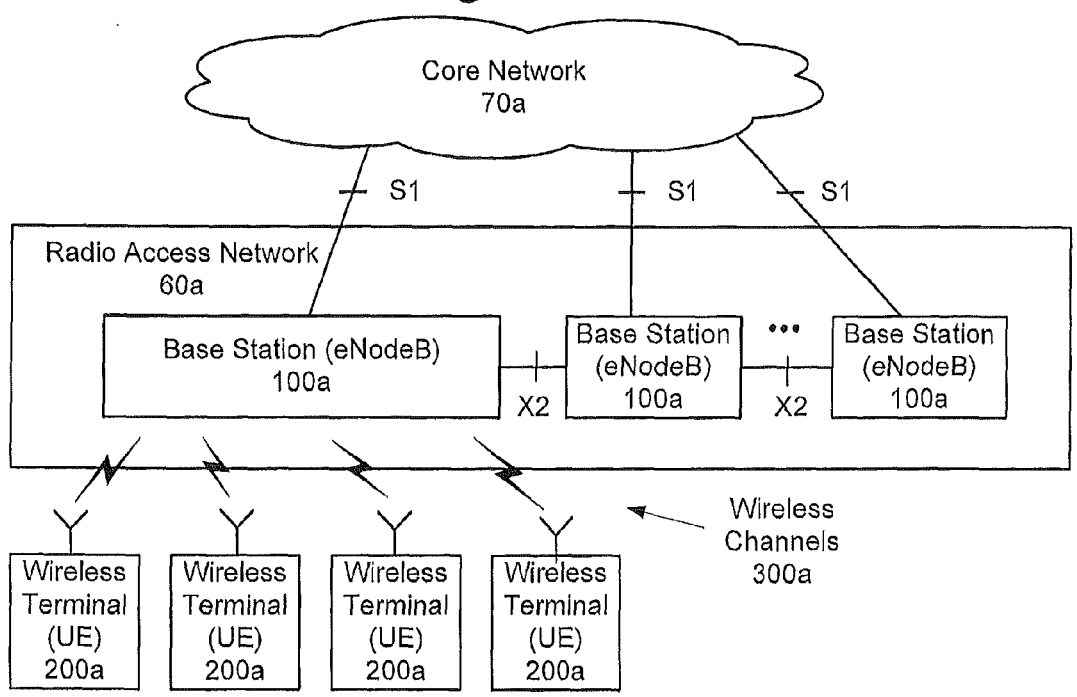
FIGS. 1A and 1B are block diagrams of communication systems that are configured according to some embodiments.

Present inventive concepts will now be described more fully hereinafter with reference to the accompanying drawings, in which examples of embodiments of present inventive concepts are shown. Present inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN that communicates over radio communication channels with wireless terminals (also referred to as UEs). It will be understood, however, that present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of present inventive concepts, this should not be seen as limiting the scope of present inventive concepts to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of present inventive concepts may also be applied, for example, in the uplink.

FIG. 1A is a block diagram of a communication system that is configured to operate according to some embodiments of present inventive concepts. An example RAN 60a is shown that may be a Long Term Evolution (LTE) RAN. Radio base stations (e.g., eNodeBs) 100a may be connected directly to one or more core networks 70a. In some embodiments, functionality of a radio network controller(s) may be performed by radio base stations 100a. Radio base stations 100a communicate over wireless channels 300a with wireless terminals (also referred to as user equipment nodes or UEs) 200a that are within their respective communication service cells (also referred to as coverage areas). The radio base stations 100a can communicate with one another through an X2 interface and with the core network(s) 70a through S1 interfaces, as is well known to one who is skilled in the art.

Figure 1B:
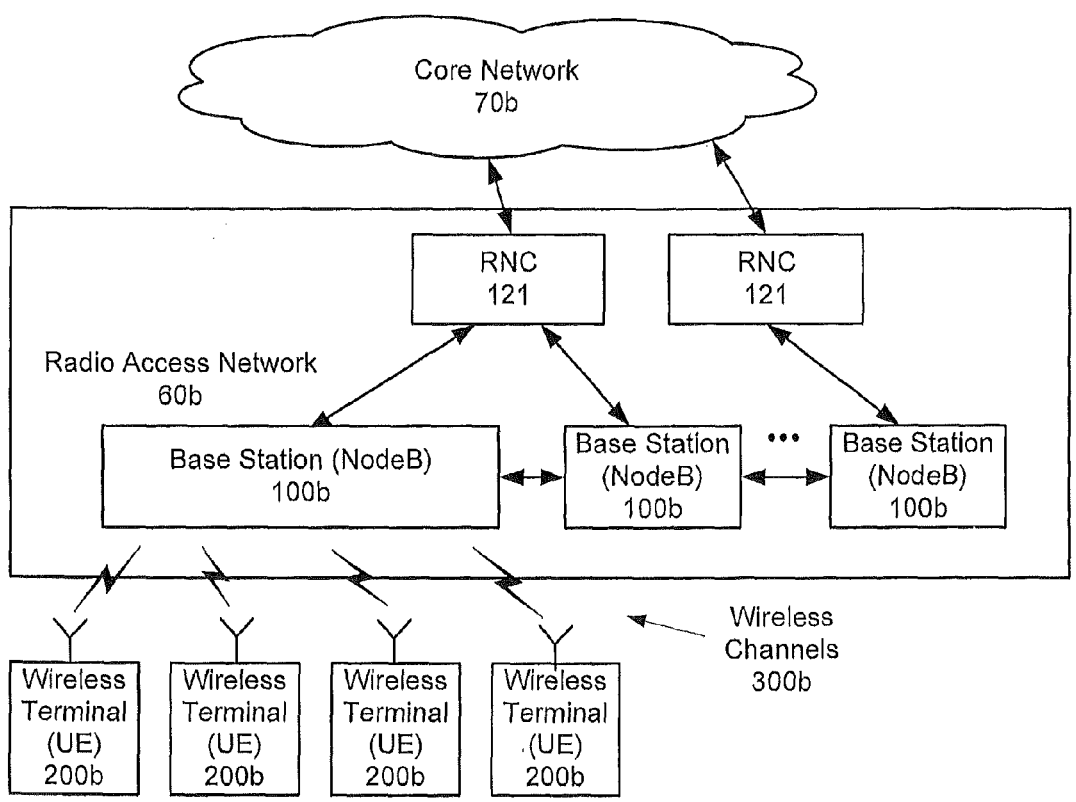

FIG. 1B is a block diagram of a communication system that is configured to operate according to some other embodiments of present inventive concepts. An example RAN 60b is shown that may be a WCDMA RAN. Radio base stations (e.g., NodeBs) 100b may be coupled to core network(s) 70b through one or more radio network controllers (RNCs) 65b. In some embodiments, functionality of a radio network controller(s) may be performed by radio base stations 100b. Radio base stations 100b communicate over wireless channels 300b with wireless terminals (also referred to as user equipment nodes or UEs) 200b that are within their respective communication service cells (also referred to as coverage areas). The radio base stations 100b can communicate with one another and with the core network(s) 70b, as is well known to one who is skilled in the art.

Figure 2A:
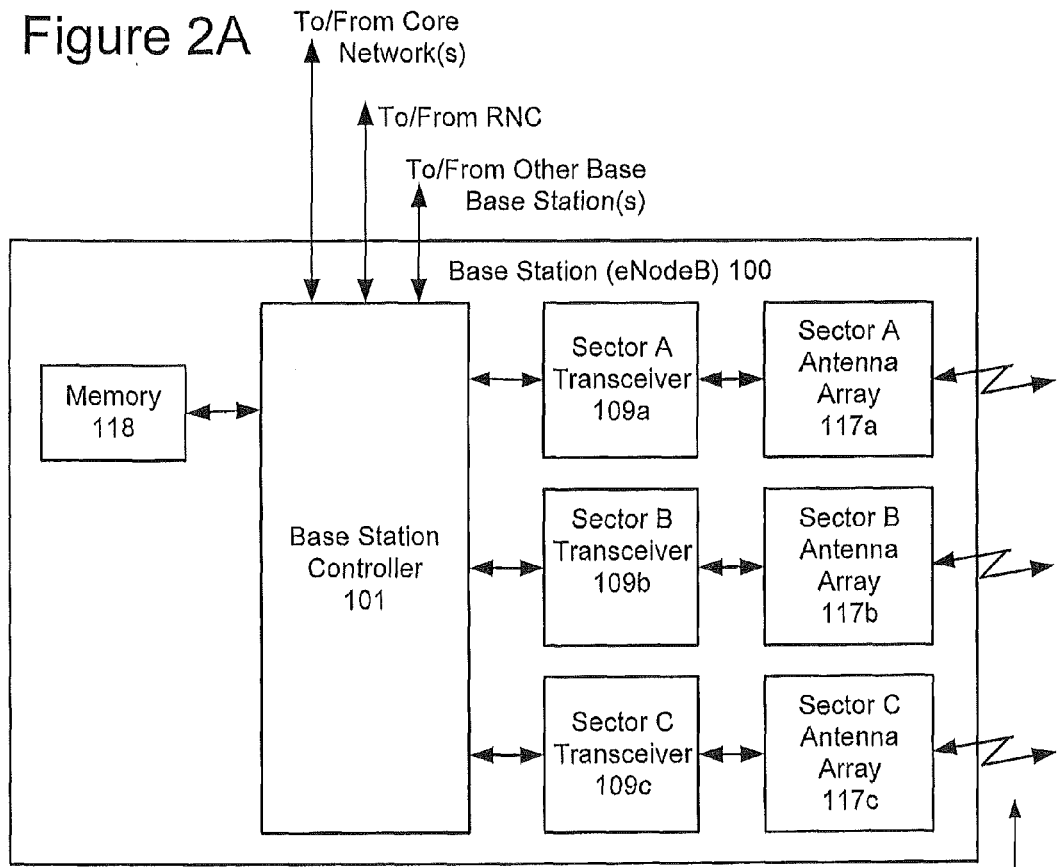

FIG. 2A is a block diagram of a base station 100 (e.g., base station 100a and/or 100b) of FIG. 1A and/or FIG. 1B configured to provide service over three 120 degree sectors (sectors A, B, and C) surrounding the base station according to some embodiments. As shown, for example, base station 100 may include three transceivers 109a, 109b, and 109c coupled between base station controller 101 and respective sector antenna arrays 117a, 117b, and 117c (each of which may include multiple MIMO antennas), and memory 118 coupled to processor 101.

More particularly, each transceiver 109 may include a receiver and a transmitter. Each receiver may be configured to generate digital data streams corresponding to one or more transport blocks received through the respective sector antenna array 117 from wireless terminals 200 located in a sector serviced by the respective sector antenna array. Each transmitter may be configured to transmit one or more transport blocks through the respective sector antenna array 117 to wireless terminals 200 located in the sector serviced by the sector antenna array responsive to a digital data stream from processor 101. Accordingly, base station 100 of FIG. 1 may define three 120 degree sectors A, B, and C surrounding the base station, transceiver 109a and sector antenna array 117a may support MIMO communications for wireless terminals 200 in sector A of base station 100, transceiver 109b and sector antenna array 117b may support MIMO communications for wireless terminals 200 in sector B of base station 100, and transceiver 109c and sector antenna array 117c may support MIMO communications for wireless terminals 200 in sector C of base station 100.

Figure 2B:
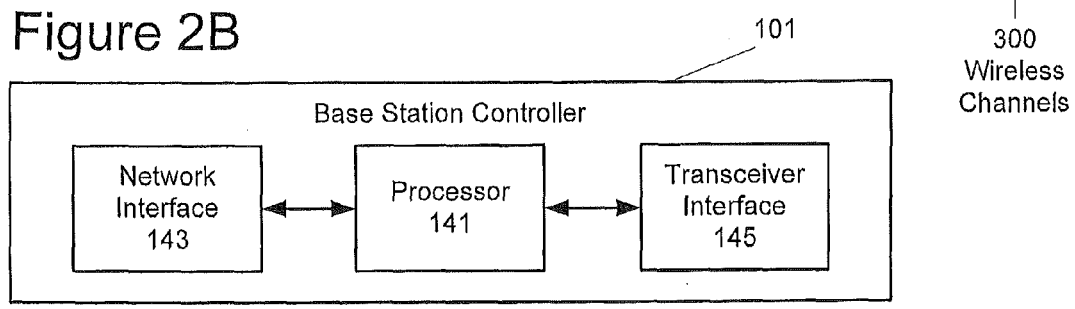

FIG. 2B is a block diagram of base station controller 101 of FIG. 2A according to some embodiments. As shown, for example, base station controller 101 may include processor 141, network interface 143, and transceiver interface 145. Network interface 143 may provide a communications interface between processor 141 and core network 70, between processor 141 and RNC 121, and/or between processor 141 and other base stations 100. Transceiver interface 145 may be configured to provide a communications interface between processor 141 and each of transceivers 109a, 109b, and 109c.

Figure 2C:
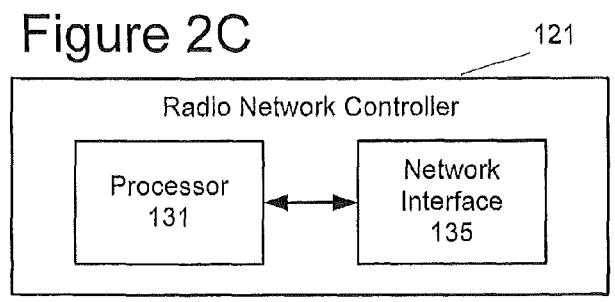

FIG. 2C is a block diagram of a radio network controller (RNC) 121 of FIG. 1B according to some embodiments. As shown, for example, RCN 121 may include processor 131 and network interface 135. Network interface 143 may provide a communications interface between processor 131 and base stations 100 and/or between processor 131 and core network 70. According to some other embodiments functionality of RNC 121 may be included in base station 100 (e.g., in one or more of base stations 100a and/or 100b).

FIG. 2D is a block diagram of a wireless terminal (UE) 200 (e.g., wireless terminal 200a and/or 200b) of FIG. 1A and/or FIG. 1B according to some embodiments. Wireless terminal 200, for example, may be a cellular radiotelephone, a smart phone, a laptop/netbook/tablet/handheld computer, or any other device providing wireless communications. Wireless terminal 200, for example, may include processor 201, user interface 211 (e.g., including a visual display such as an liquid crystal display, a touch sensitive visual display, a keypad, a speaker, a microphone, etc.), memory 218, transceiver 209, and antenna array 217 (including a plurality of antenna elements). Moreover, transceiver 209 may include a receiver allowing processor 201 to receive data from radio access network 60 over one or more wireless channels 300 through antenna array 217 and transceiver 209, and transceiver 209 may include a transmitter allowing processor 201 to transmit data through transceiver 209 and antenna array 217 over one or more wireless channels 300 to radio access network 60.

By providing a plurality of antenna elements in antenna array 217, wireless terminal 200 may receive MIMO communications allowing spatial multiplexing and/or diversity gain as discussed above. A maximum number of downlink MIMO channels that may be received simultaneously during multi-point and/or single-point MIMO by wireless terminal 200, however, may be equal to the number of antenna elements included in antenna array 217. According to some embodiments of present inventive concepts, antenna array 217 may include two antenna elements, and wireless terminal 200 may be limited to receiving no more that 2 MIMO downlink steams simultaneously. During single-point MIMO communications with antenna array 217 including 2 antenna elements, wireless terminal 200 may receive up to two MIMO downlink data streams simultaneously from a same sector antenna array of RAN 60. During multi-point MIMO communications with antenna array 217 including 2 antenna elements, wireless terminal 200 may receive a first MIMO downlink data stream from a first sector antenna array of RAN 60 and a second MIMO downlink data stream from a second sector antenna array of RAN 60.

In a downlink direction, RNC 121 (or processor 131 thereof) may split out different downlink data streams from core network 70 to respective base stations 100 for transmission to wireless terminals 200 in communication with the respective base stations 100. For downlink data streams received at a particular base station 100, the base station controller 101 (or processor 141 thereof) may split out different ones of the downlink data streams for transmission through the transceivers and sector antenna arrays of the respective sectors A, B, and C to wireless terminals 200 communicating through the respective sectors of the base station.

In an uplink direction, base station controller 101 (or processor 141 thereof) may combine the different uplink data streams received through the sector antenna arrays of sectors A, B, and C. Similarly, RNC 121 (or processor 135 thereof) may combine the uplink data streams from the different base stations 100, and transmit the combined uplink data streams to core network 70.

A downlink data stream for a particular wireless terminal 200 may thus include a plurality of transport blocks provided from core network 70 through radio network controller 121, through base station controller 101 of the base station 100 with which the wireless terminal 200 is communicating, and through the transceiver 109 and sector antenna array 117 for the sector in which the wireless terminal 200 is located. For every transport block received at RNC 121, processor 131 of RNC 121 may direct the downlink transport block to a respective base station 100, and for every transport block 117 received at a base station 100, processor 141 of base station controller 101 may direct the downlink transport block to a respective transceiver and sector antenna array for transmission over the appropriate sector.

When a wireless terminal is located in a border area between two sectors, transport blocks from the same downlink stream (e.g., supporting a radiotelephone voice communication between the wireless terminal and another communication device, supporting a data communication between the wireless terminal and a remote server, etc.) may be transmitted from sector antenna arrays of the two different sectors to the wireless terminal to provide increased throughput using multi-point communications (e.g., using MP-HSDPA). If the two different sectors are co-located at a same base station, processor 141 of base station controller 101 may split the transport blocks of the downlink data stream to the different transceivers 109 supporting the different sectors to provide intra node aggregation as discussed in greater detail below with respect to FIG. 3A. If the two different sectors are located at different base stations, processor 131 of RNC 121 may split the transport blocks of the downlink data stream to the different base stations 100 supporting the different sectors to provide inter node aggregation as discussed in greater detail below with respect to FIG. 3B.

Figure 3A:
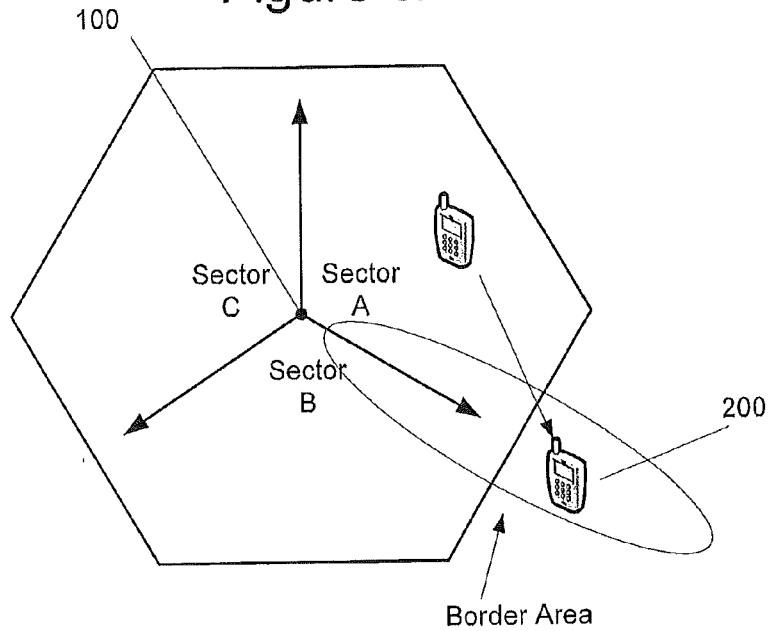
FIGS. 3A and 3B are schematic diagrams respectively illustrating intra node and inter node Multi-Point communications according to some embodiments.

As shown in FIG. 3A, base station 100 of FIG. 2A may support communications with wireless terminals in three different 120 degree sectors A, B, and C. More particularly, transceiver 109a and sector antenna array 117a may support MIMO communications with wireless terminals located in Sector A, transceiver 109b and sector antenna array 117b may support MIMO communications with wireless terminals located in Sector B, and transceiver 109c and sector antenna array 117c may support MIMO communications with wireless terminals located in Sector C. Stated in other words, each of sector antenna arrays 117a, 117b, and 117c (together with respective transceivers 109a, 109b, and 109c) defines a respective 120 degree sector A, B, and C. When wireless terminal 200 is initially located in a central portion of sector A as shown in FIG. 3A, RAN 60 may provide wireless communications for a downlink data stream (made up of transport blocks) by transmitting transport blocks of the downlink data stream through transceiver 109a and sector antenna array 117a over a wireless channel 300 to wireless terminal 200.

When wireless terminal 200 moves from a central portion of sector A to a border area between sectors A and B as indicated by the arrow in FIG. 3A, intra node Multi-Point communications may be used to transmit different transport blocks of the downlink data stream in parallel through transceiver 109a and sector antenna array 117a and through transceiver 109b and sector antenna array 117b to wireless terminal 200 (e.g., using MP-HSDPA). More particularly, different first and second transport blocks of the same data stream may be respectively transmitted from sector antenna arrays 117a and 117b using a same time/frequency resource element (TFRE) to increase downlink throughput for the wireless terminal in the border area (also referred to as a soft handover region). As used herein, the term time/frequency resource element may refer to a time/frequency/code resource element.

When wireless terminal 200 is in a border area between two sectors A and B of the same base station 100 as shown in FIG. 3A, all transport blocks for the data stream to the wireless terminal 200 may be processed through a single base station controller 101 where the decision is made for each transport block of the data stream whether to transmit through sector antenna array 117a or 117b. Stated in other words, only one Radio Link Control (RLC) flow is required for the data stream with the data split being performed at a Media Access Control (MAC) layer using processor 141 of base station controller 101. With intra node Multi-Point communications as shown in FIG. 3A, the data split may be transparent with respect to RNC 121.

When wireless terminal 200 moves from a central portion of sector A to a border area between sectors A and B, processor 141 of base station controller 101 may decide whether to provide Multi-Point communications for wireless terminal 200. As discussed, for example, in co-pending U.S. patent application Ser. No. 13/328,139 (entitled "Methods Providing Multipoint Communications Based on Sector Loads and Related Network Nodes") to Nammi et al, and filed Dec. 16, 2011, the decision to provide Multi-Point communications may be based on a communication load in sector A and/or sector B.

Figure 4A:
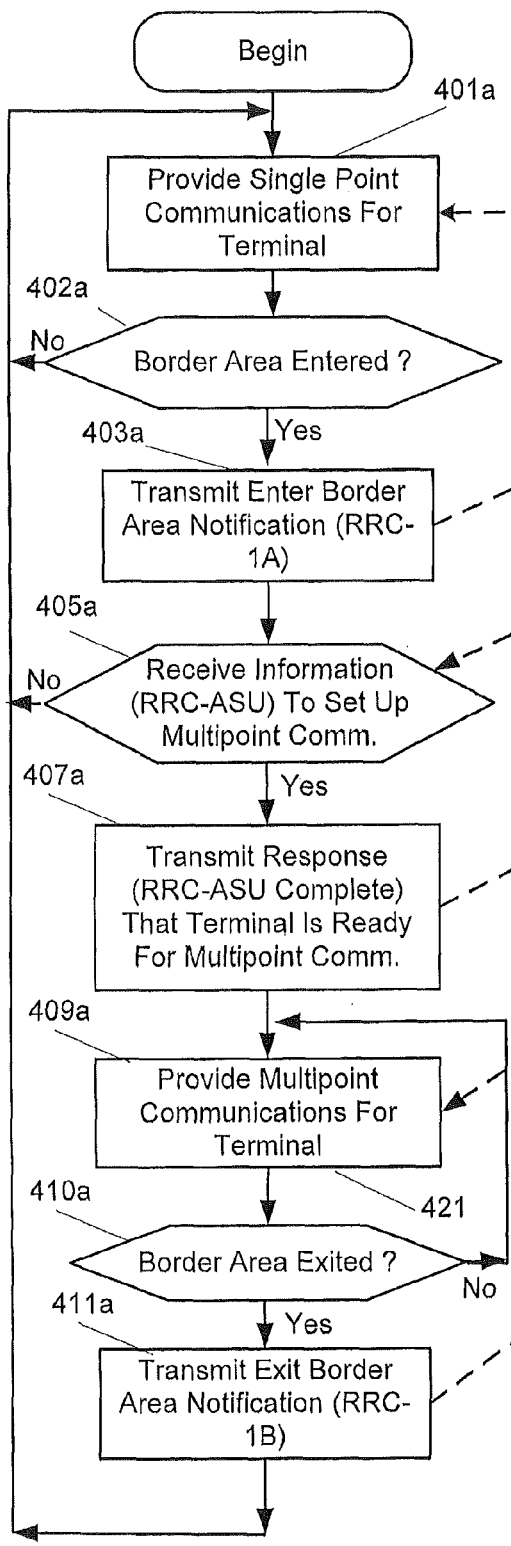
FIG. 4A is a flow chart illustrating operations of wireless terminals providing Multi-Point HSDPA communications according to some embodiments.
Figure 4B:
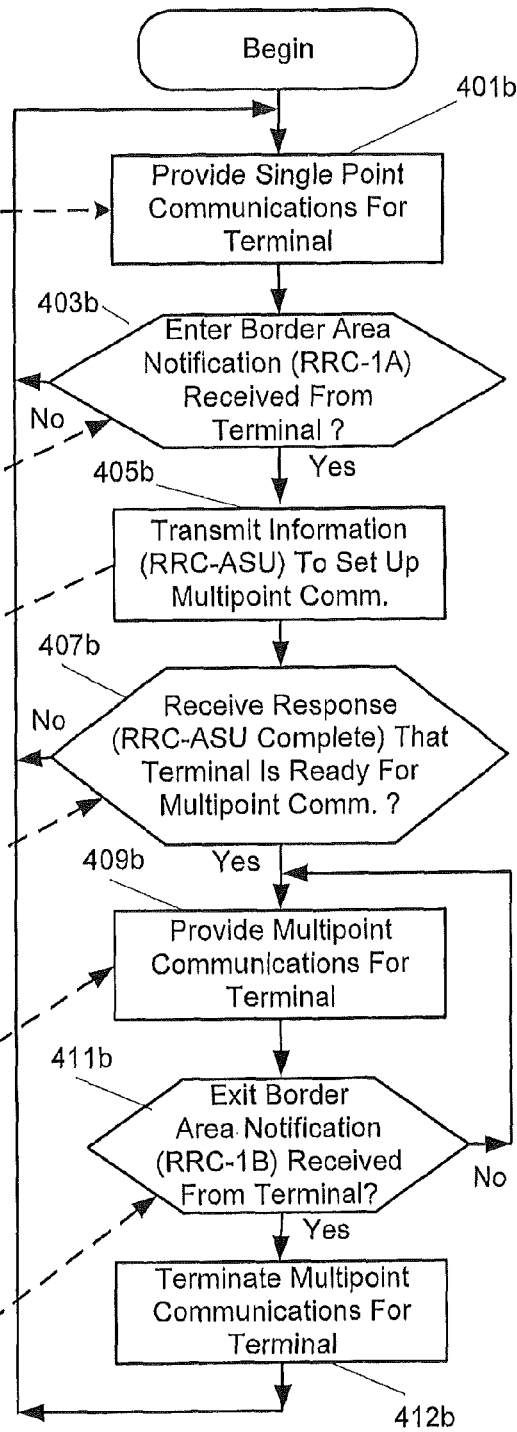
FIG. 4B is a flow chart illustrating operations of base stations providing Multi-Point HSDPA communications according to some embodiments.

Operations to provide Single-Point and Multi-Point communications for wireless terminal 200 moving between central portions of Sector A and a border area between sectors A and B of FIG. 3A are discussed in greater detail with respect to the flow charts of FIGS. 4A and 4B. More particularly, FIG. 4A illustrates operations of wireless terminal 200 and FIG. 4B illustrates operations of RAN 60 base station 100. Wireless terminal 200 may initially be located in a central portion of sector A (also referred to as a primary sector), and processor 141 of base station controller 101 may transmit transport blocks of a data stream through transceiver interface 145, transceiver 109a, and sector antenna array 117a (also referred to as a primary sector antenna array) for sector A to wireless terminal 200 (without providing Multi-Point communications). Wireless terminal 200 processor 201 may receive these Single-Point communications from sector antenna array 117a through antenna array 217 and transceiver 209. Such single-point downlink communications may be provided at blocks 401a and 401b for wireless terminal 200 as long as wireless terminal 200 remains in central portions of sector A at blocks 401a, 401b, and 402a.

If wireless terminal 200 moves from a central portion of sector A to a border area between sectors A and B as indicated by the arrow of FIG. 3A at block 402a, wireless terminal 200 processor 201 may transmit a notification of entry into the border area (e.g., a Radio Resource Control Event 1A message or an RRC-1A message) through transceiver 209 and antenna array 217 to RAN 60 at block 403a. Wireless terminal 200 processor 201, for example, may monitor control signals transmitted from sector antenna arrays 117a-c of base station 100 and/or from sector antenna arrays of other base stations, and measures of relative signal strengths of these control signals may be used by wireless terminal 200 processor 201 to determine sectors and/or sector antenna arrays suitable for communication. If such a notification (e.g., an RRC-1A message) is received from wireless terminal 200 at base station 100 at block 403b, processor 141 of base station controller 101 may identify sector B as a secondary sector for communication with wireless terminal 200. The notification (e.g., the RRC-1A message) from wireless terminal 200 at blocks 403a and 403b, for example, may identify the primary and secondary sectors and/or sector antenna arrays that may be available for Multi-Point communications in the border area.

At block 405b, base station processor 141 may transmit information (e.g., a Radio Resource Control Active Set Update message or RRC-ASU message) to set up Multi-Point communications with wireless terminal 200 in the border area between sectors A and sector B, and the information (e.g., RRC-ASU) may be received at wireless terminal 200 at block 405a. Base station processor 141 may transmit the information (e.g., RRC-ASU message) through transceiver interface 145, transceiver 109a, and sector antenna array 117a to wireless terminal 200, and the information may be received at wireless terminal processor 201 through antenna array 217 and transceiver 209. Upon receipt of the information (e.g., RRC-ASU message) at block 407a, wireless terminal 200 processor 201 may respond at block 407a with a communication (e.g., a Radio Resource Control Active Set Update Complete message or RRC-ASU complete message) to confirm that the wireless terminal 200 is ready to receive Multi-Point communications. Wireless terminal processor 201 may transmit the communication (e.g., the RRC-ASU complete message) through transceiver 209 and antenna array 217 to base station 100.

Responsive to receipt of the communication (e.g., RRC-ASU complete message) from wireless terminal 200 at processor 141 at block 407b (through sector antenna array 117a, transceiver 109a, and transceiver interface 145), base station processor 141 and wireless terminal processor 201 may provide Multi-Point communications for wireless terminal 200 at blocks 409a and 409b. More particularly, processor 141 may transmit some transport blocks of the data stream through transceiver interface 145, transceiver 109a and sector antenna array 117a to wireless terminal 200 while transmitting other transport blocks of the data stream through transceiver interface 145, transceiver 109b, and sector antenna array 117b to wireless terminal 200. Moreover, first and second different transport blocks of the same data stream may be respectively transmitted from sector antenna array 117a and from sector antenna array 117b to wireless terminal 200 using a same frequency during a same time interval (e.g., using a same TFRE). Wireless terminal processor 201 may receive these transport blocks through antenna array 217 and transceiver 209.

As long as wireless terminal 200 remains in the border area between sectors A and B at blocks 409a, 409b, 410a, and 411b, base station processor 141 and wireless terminal processor 201 may continue providing Multi-Point communications for wireless terminal 200 at blocks 409a and 409b. As noted above, wireless terminal 200 processor 201 may monitor control signals and/or signal strengths thereof to determine base station sector antenna arrays and/or sectors suitable for communication. If wireless terminal 200 leaves the border area between sectors A and B at block 410a, wireless terminal processor 201 may transmit a notification of exit from the border area (e.g., a Radio Resource Control 1B message or RRC-1B message) at block 411a through transceiver 209 and antenna array 217. Upon receipt of such an exit notification at block 411b, processor 141 may terminate Multi-Point communications for wireless terminal at block 412b, and revert to providing single-point communications from only a primary sector antenna array at blocks 401a and 401b (e.g., sector antenna array 117a if wireless terminal 200 moves into a central area of sector A or sector antenna array 117b if wireless terminal 200 moves into a central area of sector B). The exit notification (e.g., an RRC-1B message) may identify the sector and/or sector antenna array from which single-point communications may be provided.

Figure 3B:
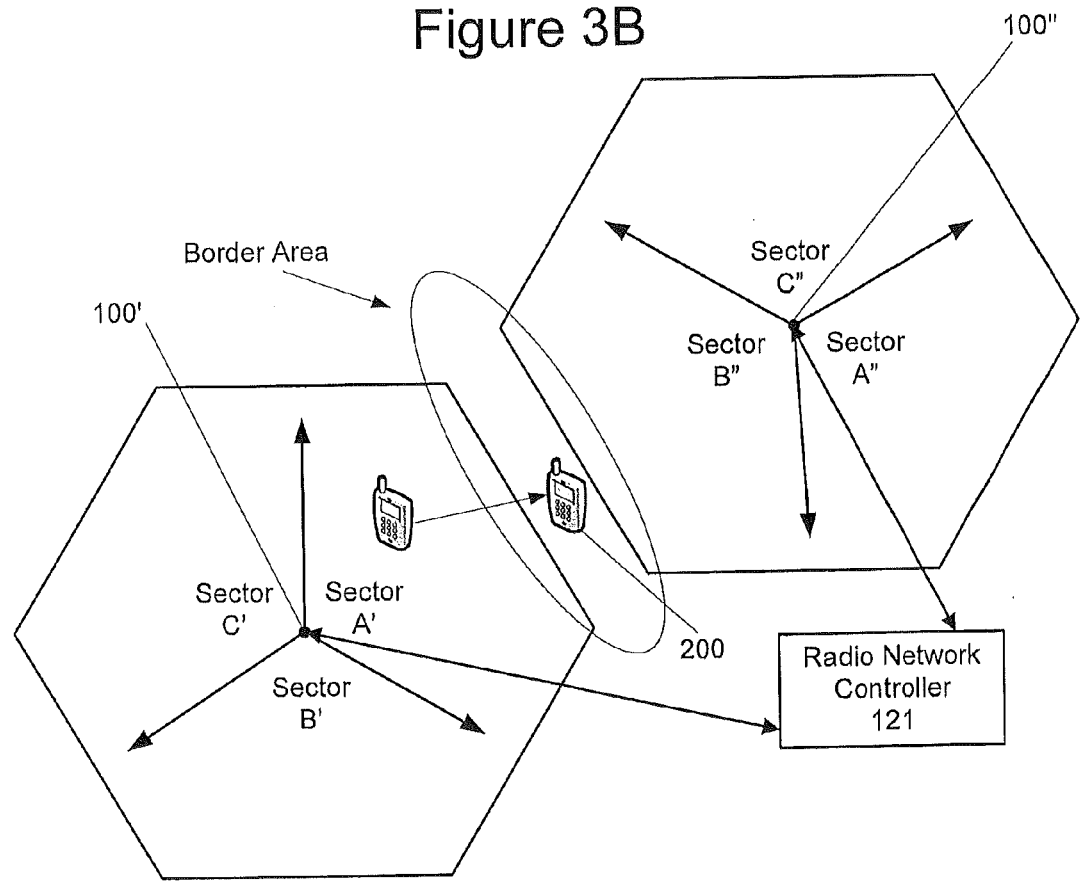

As shown in FIG. 3B, two base stations, identified as base stations 100' and 100", may support communications with wireless terminals, with each of base stations 100' and 100" separately having the structure of FIG. 2A (using prime and double prime notation to separately identify elements of the different base stations 100' and 100"). In addition, each base station 100' and 100" may be coupled to RNC 121. Moreover, base stations 100' and 100" may support MIMO communications with wireless terminals located in 120 degree sectors A', B', and C' surrounding base station 100', and base station 100" may support MIMO communications with wireless terminals located in 120 degree sectors A", B", and C" surrounding base station 100". More particularly, transceiver 109a' and sector antenna array 117a' may support MIMO communications with wireless terminals located in Sector A', transceiver 109b' and sector antenna array 117b' may support MIMO communications with wireless terminals located in Sector B', and transceiver 109c' and sector antenna array 117c' may support MIMO communications with wireless terminals located in Sector C'. Similarly, transceiver 109a" and sector antenna array 117a' may support MIMO communications with wireless terminals located in Sector A", transceiver 109b" and sector antenna array 117b" may support MIMO communications with wireless terminals located in Sector B", and transceiver 109c" and sector antenna array 117c" may support MIMO communications with wireless terminals located in Sector C". When wireless terminal 200 is initially located in a central portion of sector A' as shown in FIG. 3B, RAN 60 may provide wireless communications for a downlink data stream made up of transport blocks by transmitting the downlink data stream through transceiver 109a' and sector antenna array 117a' over a wireless channel 300 to wireless terminal 200.

When wireless terminal 200 moves from a central portion of sector A' to a border area between sectors A' and B" (of different base stations 100' and 100") as indicated by the arrow in FIG. 3B, inter node Multi-Point communications may be used to transmit different transport blocks of the downlink data stream in parallel through transceiver 109a' and sector antenna array 117a' of base station 100' and through transceiver 109b" and sector antenna array 117b" of base station 100" to wireless terminal 200 (e.g., using MP-HSDPA). More particularly, different first and second transport blocks of the same data stream may be respectively transmitted from sector antenna arrays 117a' and 117b" using a same time/frequency resource element (TFRE) to increase downlink throughput for the wireless terminal in the border area (also referred to as a soft handover region). According to other embodiments, Multi-Point communications may be used to transmit the same transport block from sector antenna arrays 117a' and 117b" using a same TFRE to provide increased reliability of reception due to diversity gain.

When wireless terminal 200 is in a border area between two sectors A' and B" of different base stations 100' and 100" as shown in FIG. 3B, all transport blocks for the data stream to the wireless terminal 200 may be processed through a single radio network controller (RNC) 121 where the decision is made by processor 131 for each transport block of the data stream whether to transmit through sector antenna array 117a' of base station 100' or sector antenna array 117b" of base station 100". Even though transport blocks of the data stream may be transmitted from sector antenna arrays 117a' and 117b" using a same TFRE, timing mismatch may occur because schedulers of base stations 100' and 100" may act independently and/or because transmission delays between wireless terminal 200 and base stations 100' and 100" may be different (due to different distances between wireless terminal 200 and base stations 100' and 100").

When wireless terminal 200 moves from a central portion of sector A' to a border area between sectors A' and B", processor 131 of radio network controller 121 may decide whether to provide Multi-Point communications based on a load of sector B". As discussed, for example, in U.S. patent application Ser. No. 13/328,139 (entitled "Methods Providing Multipoint Communications Based on Sector Loads and Related Network Nodes") to Nammi et al. and filed Dec. 16, 2011, the decision to provide Multi-Point communications may be based on a communication load in sector A' and/or sector B".

Operations to provide Single-Point and Multi-Point communications to wireless terminal 200 moving between central portions of Sector A' and a border area between sectors A' and B" of FIG. 3B are discussed in greater detail with respect to the flow chart of FIGS. 4A and 4B. As noted above, FIG. 4A illustrates operations of wireless terminal 200 and FIG. 4B illustrates operations of RAN 60 including base stations 100' and 100" and RNC 121. Wireless terminal 200 may initially be located in a central portion of sector A' (also referred to as a primary sector) of base station 100', and processor 131 of RNC 121 may transmit transport blocks of a data stream through network interface 135, base station controller 101', transceiver 109a', and sector antenna array 117a' (also referred to as a primary sector antenna array) for sector A' to wireless terminal 200 (without providing Multi-Point communications). Wireless terminal processor 201 may receive these single-point from sector antenna array 117a' through antenna array 217 and transceiver 209. Such single-point communications may be provided for wireless terminal 200 as long as wireless terminal 200 remains in central portions of sector A' at blocks 401a, 401b, and 402a.

If wireless terminal 200 moves from a central portion of sector A' to a border area between sectors A' and B" as indicated by the arrow of FIG. 3B at block 402a, wireless terminal 200 processor 201 may transmit a notification of entry into the border area (e.g., a Radio Resource Control Event 1A message or an RRC-1A message) through transceiver 209 and antenna array 217 to RAN 60 at block 403a. Wireless terminal 200 processor 201, for example, may monitor control signals transmitted from sector antenna arrays 117a'-c' and 117a"-c" of base stations 100' and 100" and/or from sector antenna arrays of other base stations, and measures of relative signal strengths of these control signals may be used by wireless terminal 200 to determine base stations, sectors and/or sector antenna arrays suitable for communication. If such a notification (e.g., an RRC-1A message) is received from wireless terminal 200 at base station 100' (through sector antenna array 117a', transceiver 109a', and base station controller 101') and/or at base station 100" (through sector antenna array 117a", transceiver 109a", and base station controller 101") at block 403b, processor 131 of RNC 121 may identify sector B" of base station 100" as a secondary sector for communication with wireless terminal 200. The notification (e.g., the RRC-1A message) from wireless terminal 200, for example, may identify the primary and secondary base stations, sectors, and/or sector antenna arrays that may be available for Multi-Point communications in the border area.

At block 405b, processor 131 may transmit information (e.g., a Radio Resource Control Active Set Update message or RRC-ASU message) to set up Multi-Point communications with wireless terminal 200 in the border area between sector A' and sector B", and the information may be received at wireless terminal 200 at block 405a. Processor 131 may transmit the information (e.g., RRC-ASU message) through network interface 145, base station controller 101', transceiver 109a', and sector antenna array 117a' to wireless terminal 200, and processor 201 may receive the information through antenna array 217 and transceiver 209. Upon receipt of the information (e.g., RRC-ASU message) at block 405a, wireless terminal 200 may respond with a communication (e.g., a Radio Resource Control Active Set Update Complete message or RRC-ASU complete message) to confirm that the wireless terminal 200 is ready to receive Multi-Point communications. Wireless terminal processor 201 may transmit the communication through transceiver 209 and antenna array 217 to base station(s) 100' and/or 100".

Responsive to receipt of the communication (e.g., RRC-ASU complete message) from wireless terminal 200 at processor 131 at block 407b (through sector antenna array 117a', transceiver 109a', base station controller 101', and network interface 135), RNC processor 131 and wireless terminal processor 201 may provide Multi-Point communications for wireless terminal 200 at blocks 409a and 409b. More particularly, processor 131 may transmit some transport blocks of the data stream through network interface 135, base station controller 101', transceiver 109a', and sector antenna array 117a' to wireless terminal 200 while transmitting other transport blocks of the data stream through network interface 135, base station controller 101", transceiver 109b", and sector antenna array 117b" to wireless terminal 200. Moreover, first and second different transport blocks of the same data stream may be respectively transmitted from sector antenna array 117a' and from sector antenna array 117b" to wireless terminal 200 using a same frequency during a same time interval (e.g., using a same TFRE). As noted above, a mismatch of reception times for inter node Multi-Point communications at wireless terminal 200 may be greater than a mismatch of reception times for intra node Multi-Point communications because base stations 100' and 100" may use independent schedulers and/or because a distance between mobile terminal 200 and base station 100' may be different than a distance between mobile terminal 200 and base station 100" (resulting in different transmission delays).

As long as wireless terminal 200 remains in the border area between sector A' of base station 100' and sector B" of base station 100", processor 131 and wireless terminal processor 201 may continue providing Multi-Point communications for wireless terminal 200 at blocks 409a, 409b, 410a, and 411b. As noted above, wireless terminal 200 may monitor control signals and/or signal strengths thereof to determine base stations, sector antenna arrays, and/or sectors suitable for communication. If wireless terminal 200 leaves the border area between sectors A' and B" at block 410a, wireless terminal 200 may transmit a notification of exit from the border area (e.g., a Radio Resource Control 1B message or RRC-1B message) at block 411a through transceiver 209 and antenna array 217. Upon receipt of such an exit notification (through either base station 100' or 100") at block 411b, processor 131 may terminate Multi-Point communications for wireless terminal at block 412b, and revert to providing single-point communications from only a primary sector antenna array of a primary base station at blocks 401a and 401b (e.g., sector antenna array 117a' of base station 100' if wireless terminal 200 moves into a central area of sector A' or sector antenna array 117b" of base station 100" if wireless terminal 200 moves into a central area of sector B"). The exit notification (e.g., an RRC-1B message) may identify the base station, sector, and/or sector antenna array from which single-point communications may be provided.

When using either inter or intra node MP-HSDPA Multi-Point communications as discussed above with respect to FIGS. 3A, 3B, 4A, and 4B, the primary sector antenna array (e.g., sector antenna array 117a or 117a') may transmit transport blocks for first data and control channels (e.g., a first high speed shared control channel or HS-SCCH and a first high speed physical downlink shared channel or HS-PDSCH) to wireless terminal 200, and the secondary sector antenna array (e.g., sector antenna array 117b or 117b") may transmit transport blocks for second data and control channels (e.g., a second high speed shared control channel or HS-SCCH and a second high speed physical downlink shared channel or HS- PDSCH) to wireless terminal 200, In the opposite direction, wireless terminal 200 may transmit a high speed dedicated physical control channel (HS-DPCCH) that is received by both primary and secondary sector antenna arrays.

For single-point and multi-point MIMO downlink transmissions from RAN 60 to wireless terminal 200, a codebook of precoding vectors (known at both RAN 60 and wireless terminal 200) is used to precode the different data streams (layers) transmitted from a sector antenna array(s) to the wireless terminal 200 and to decode the data streams (layers) received at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 is used by the base station (in single-point MIMO communications) or base stations (in multi-point MIMO communications) to select a precoding vector from the codebook for respective downlink transmissions to the wireless terminal 200.

By way of example, each base station sector antenna array 117 may include 4 antennas and wireless terminal antenna array 217 may include two antennas so that wireless terminal 200 may receive up to two downlink data streams (layers) from one base station sector antenna array during single-point MIMO communications at blocks 401a and 401b, or so that wireless terminal 200 may receive first and second downlink data streams (layers) from respective first and second sector antenna arrays during multi-point MIMO communications at blocks 409a and 409b. In this example, the codebook may include Rank 1 precoding vectors (used when transmitting one downlink data stream from a base station sector antenna array 117 to wireless terminal 200 in either single or multi point MIMO communications) and Rank 2 precoding vectors (used when transmitting two downlink data streams from a base station sector antenna array 117 to wireless terminal 200 in single-point MIMO communications).

As discussed in greater detail below, wireless terminal 200 and/or a base station 100 in communication therewith may select a precoding vector for the downlink(s) based on the current status of the downlink as a single or multi point downlink. If RAN 60 is providing single-point downlink communications from a single base station sector antenna array 117 as discussed above with respect blocks 401a and 401b of FIGS. 4A and 4B, selection of any of the precoding vectors (of Rank 1 or Rank 2) of the codebook may be allowed for the one downlink channel to provide spatial multiplexing from the single base station sector antenna array 117 in favorable channel conditions. If RAN 60 is providing multi-point downlink communications from different first and second base station sector antenna arrays as discussed above with respect to blocks 409a and 409b of FIGS. 4A and 4B, selection of only Rank 1 precoding vectors may be allowed for the first and second downlink channels provided by the respective first and second base station sector antenna arrays.

Figure 5:
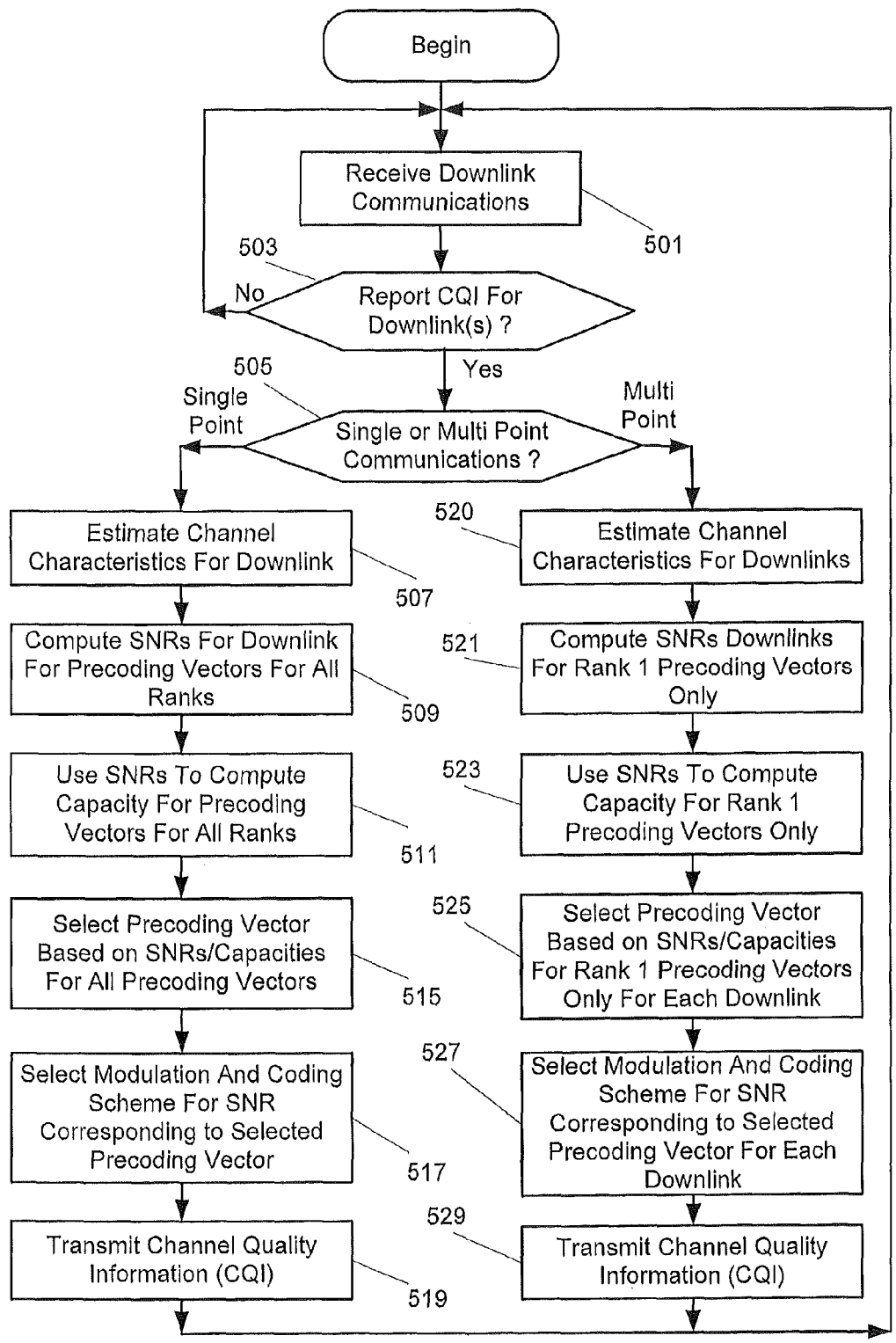
FIG. 5 is a flow chart illustrating operations of a wireless terminal computing/reporting channel quality information according to some embodiments.

FIG. 5 is a flow chart illustrating operations of wireless terminal 200 providing channel quality feedback information (CQI) according to some embodiments of present inventive concepts while providing single and multi point communications at blocks 401a and 409a of FIG. 4A. At block 501, processor 201 may receive single or multi point MIMO downlink communications from RAN 60 through antenna array 217 and transceiver 209. At block 503, processor 201 may decide whether or not to report channel quality information (CQI) to RAN 60. Processor 201, for example, may report CQI periodically (i.e., at set time intervals), responsive to changes in channel quality, responsive to changes in downlink error rates, etc.

Responsive to deciding to report CQI for the MIMO downlink channel or channels at block 503, processor 201 may determine at block 505 whether the downlink communications are single-point downlink communications received from only one base station sector antenna array (as discussed with respect to block 401a of FIG. 4A) or multi-point downlink communications received from two (or more) base station sector antenna arrays (as discussed with respect to block 409a of FIG. 4A).

If the downlink communications are single-point MIMO downlink communications received from only one base station sector antenna array, processor 201 may estimate channel characteristics for the downlink channel (from the one base station sector antenna array to wireless terminal 200), for example, using pilot symbols received over the downlink channel from the base station sector antenna array, at block 507. At block 509, processor 201 may use the estimated channel characteristics to compute a signal-to-noise-ratio (SNR) for each precoding vector in the precoding codebook (e.g., including Rank 1 and Rank 2 precoding vectors). At block 511, processor 201 may use the SNRs to compute a capacity for each precoding vector in the precoding codebook (e.g., including Rank 1 and Rank 2 precoding vectors). The capacity C for each precoding vector may be computed, for example, using the formula:

$$C = \log_2(1 + SNR),$$

where SNR is the computed SNR for that precoding vector.

Processor 201 may then select a precoding vector from all of the precoding vectors (e.g., including Rank 1 and Rank 2 precoding vectors) at block 515 based on the computed capacities for each of the precoding vectors. Processor 201, for example, may select a precoding vector based on the computed capacities to increase/maximize a downlink capacity. At block 517, processor 201 may perform link adaptation using the SNR for the selected precoding vector to select a modulation and coding scheme (e.g., using lookup tables stored in memory 218).

At block 519, channel quality information (CQI) may be transmitted to the base station transmitting the single-point MIMO downlink communications. The CQI, for example, may include an index (e.g., precoding control indication or PCI) identifying the precoding vector selected at block 515, and the modulation and coding scheme selected at block 517. Precoding control indication (PCI) and Channel Quality Information (CQI) are discussed, for example, in section 6A.2.2 of the technical specification 3GPP TS 25.214, V10.1.0 entitled "Physical Layer Procedures (FDD) (Release 10)," December 2010. Processor 201 may then return to block 501 to receive downlink communication based on the channel quality information reported at block 519.

At blocks 507, 509, 511, 515, 517, and 519, wireless terminal processor 201 may select any precoding vector of any rank from the codebook when receiving single-point MIMO downlink communications. Accordingly, spatial multiplexing may be provided over the single-point MIMO downlink using Rank 2 precoding vectors to increase a data rate when the channel is of a sufficient quality, or diversity gain may be provided over the single-point MIMO downlink using Rank 1 precoding vectors if the channel quality is not sufficient for spatial diversity.

If the downlink communications are multi-point MIMO downlink communications received from first and second base station sector antenna arrays at block 505, processor 201 may estimate channel characteristics for a first downlink channel from the first base station sector antenna array and for a second downlink channel from the second base station sector antenna array using, for example, using pilot symbols received over the first and second downlink channels, at block 520.

At block 521, processor 201 may use the estimated channel characteristics for the first downlink channel to compute a signal-to-noise-ratio (SNR) for each of a subset of the precoding vectors in the precoding codebook (e.g., including only Rank 1 precoding vectors and excluding Rank 2 precoding vectors) for the first downlink channel. At block 521, processor 201 may also use the estimated channel characteristics for the second downlink channel to compute a signal-to-noise-ratio (SNR) for each of the subset of the precoding vectors in the precoding codebook (e.g., including only Rank 1 precoding vectors and excluding Rank 2 precoding vectors) for the second downlink channel.

At block 523, processor 201 may use the SNRs to compute a capacity for each precoding vector in the precoding codebook of the subset (e.g., including only Rank 1 precoding vectors and excluding Rank 2 precoding vectors) for each downlink. The capacities C may be computed, for example, using the formula:

$$C = \log_2(1+SNR),$$

where SNR is the computed SNR for that precoding vector and downlink.

Processor 201 may then select a precoding vector from the subset of precoding vectors for each downlink at block 525 based on the computed capacities for each of the subset of precoding vectors for each downlink. Processor 201, for example, may select a precoding vector for each downlink based on the computed capacities to increase/maximize a downlink capacity. At block 527, processor 201 may perform link adaptation using the SNR for the selected precoding vectors to select a modulation and coding scheme for each downlink (e.g., using lookup tables stored in memory 218).

At block 529, channel quality information (CQI) may be transmitted to the base station(s) transmitting the multi-point MIMO downlink communications. The CQI, for example, may include first and second indices (e.g., precoding control indices or PCIs) identifying the precoding vectors selected for the downlinks at block 525, and the modulation and coding schemes selected for the downlinks at block 527. Processor 201 may then return to block 501 to receive downlink communication based on the channel quality information reported at block 529.

At blocks 520, 521, 523, 525, 527, and 529, wireless terminal processor 201 may select from only a subset of precoding vectors from the codebook (e.g., including only Rank 1 precoding vectors and excluding Rank 2 precoding vectors) when receiving multi-point MIMO downlink communications over first and second downlinks from first and second base station sector antenna arrays. Accordingly, spatial multiplexing over either of the multi-point MIMO downlinks may be blocked to reduce computational overhead, for example, when computing SNRs and/or capacities at blocks 521 and/or 523. Stated in other words, selection of precoding vectors may be restricted to lower rank (e.g., Rank 1) precoding vectors when receiving multi-point downlink communications. Because higher rank (e.g., Rank 2) precoding vectors may not significantly improve performance in multi-point communications (and may actually reduce performance), computational overhead may be reduced without significantly reducing performance.

Figure 6:
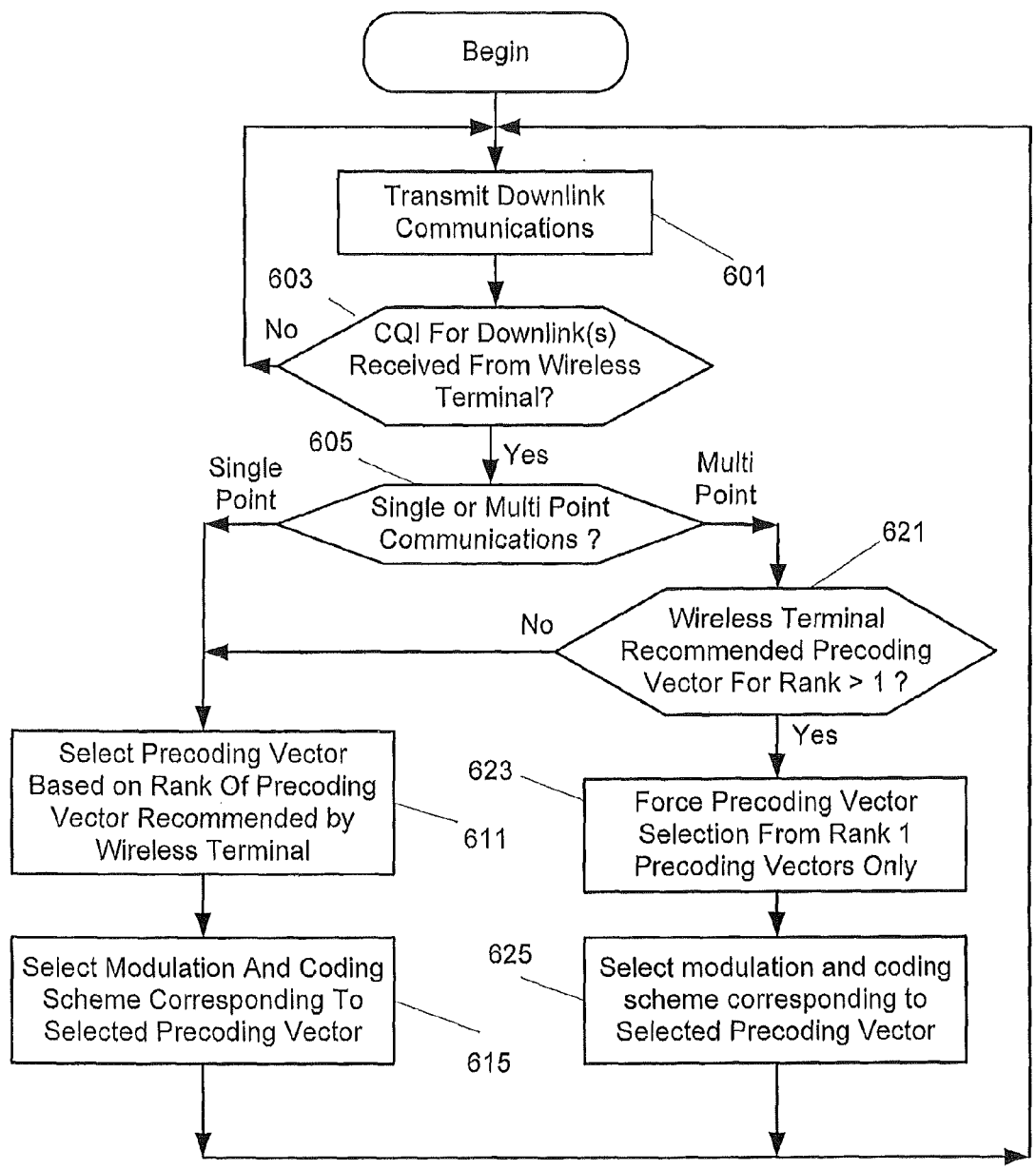
FIG. 6 is a flow chart illustrating operations of a base station computing CQI (e.g., selecting precoding vectors) according to some embodiments.

FIG. 6 is a flow chart illustrating operations of base station 100 selecting precoding vectors according to some embodiments of present inventive concepts while providing single and multi point communications at blocks 401*b* and 409*b* of FIG. 4B. At block 601, processor 141 and/or 131 may transmit single-point MIMO downlink communications to wireless terminal 200 through one base station sector antenna array or multi-point MIMO downlink communications to wireless terminal 200 through two base station sector antenna arrays.

A processor 141 of a base station 100 transmitting a single or multi point downlink communication channel to wireless terminal 200 may proceed with selection/change of a precoding vector responsive to receiving channel quality information (CQI) report at block 603. As discussed above, a CQI report during single-point communications may include an index (e.g., PCI) identifying a precoding vector for the single-point downlink channel and a modulation and coding scheme. During multi-point communications, a first CQI report may include a first index and a first modulation and coding scheme for a first multi-point downlink channel and a second CQI report may include a second index and a second modulation and coding scheme for a second multi-point downlink channel. In an alternative, a single CQI report during multi-point communications may include first and second indices and first and second modulation and coding schemes for both multi-point downlink channels.

Responsive to receiving a CQI report from wireless terminal 200, processor 141 may determine at block 605 whether the downlink communications with wireless terminal 200 are single-point downlink communications transmitted from only one base station sector antenna array (as discussed with respect to block 401*b* of FIG. 4B) or multi-point downlink communications received from two (or more) base station sector antenna arrays (as discussed with respect to block 409*b* of FIG. 4B).

If the downlink communications are single-point MIMO downlink communications transmitted from only one base station sector antenna array, processor 141 may select any precoding vector from the precoding codebook as a precoding vector for the single-point downlink channel based on the rank of the precoding vector recommended by wireless terminal 200 at block 611. Stated in other words, base station processor 141 may select a precoding vector based on a rank recommended/requested by wireless terminal 200 (without restriction selection to a subset of precoding vectors) when single-point downlink communications are provided.

At block 615, processor 141 may select a modulation and coding scheme corresponding to the selected precoding vector, and then return to block 601 to transmit downlink communications using the selected precoding vector and modulation and coding scheme. If the precoding vector and/or modulation and coding scheme selected at blocks 611 and/or 615 differs from the requested/recommended precoding vector and/or modulation and/or coding scheme in the CQI report from wireless terminal 200, the selected precoding vector and/or modulation and coding scheme (or an identification thereof) may be transmitted to wireless terminal 200.

If the downlink communications are multi-point MIMO downlink communications transmitted from first and second base station sector antenna arrays at block 605, processor 141 may determine at block 621 if wireless terminal 200 recommends a precoding vector having a rank greater than 1. If the recommended precoding vector rank is not greater than 1 (e.g., Rank 1), processor 141 may proceed with operations of blocks 611 and 615 as discussed above because a Rank 1 precoding vector is consistent with multi-point downlink communications according to embodiments of present inventive concepts.

If the recommended precoding vector rank is greater than 1 (e.g., Rank 2) for multi-point communications at block 621, however, processor 141 may force precoding vector selection from a subset of the precoding vectors (e.g., Rank 1 precoding vectors) of the codebook at block 623. Stated in other words, processor 141 may override wireless terminal 200 selection of a higher precoding vector rank (e.g., Rank 2) during multi-point communications to force selection of a precoding vector having a lower rank (e.g., Rank 1). At block 625, processor 141 may select a modulation and coding scheme corresponding to the selected precoding vector, and then return to block 601 to transmit downlink communications using the selected precoding vector and modulation and coding scheme selected at blocks 623 and 625. Using operations of FIG. 6, wireless terminal 200 may select and report any precoding vector and/or rank, but a base station may override higher rank selections during multi-point communications to select a suitable Rank 1 precoding vector.

Figure 7:
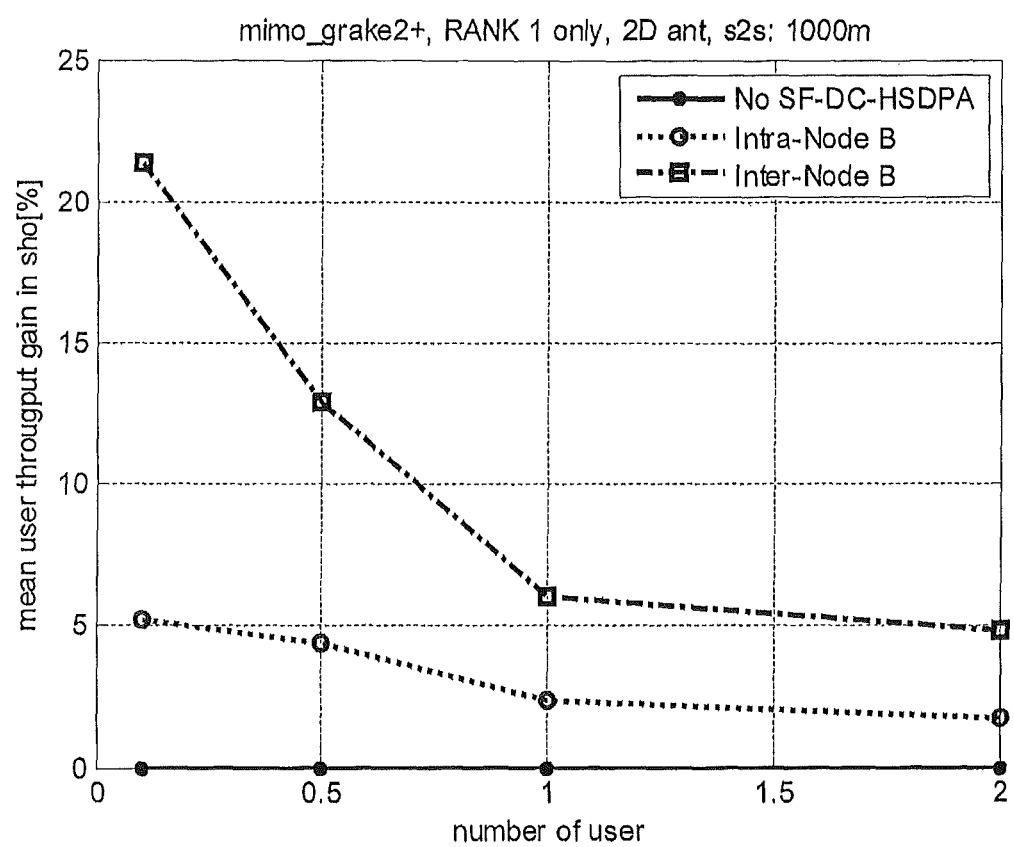
FIG. 7 is a graph illustrating simulated network performance in terms of mean user throughput gains for Rank-1 only transmissions according to some embodiments.

FIG. 7 is a graph illustrating relative gains in a border area (referred to as a soft handover or sho area) using only Rank 1 precoding vectors so that a base station sector antenna array transmits only one data stream (layer). The three data lines of FIG. 7 illustrate: (1) a baseline without multi-point communications (No SF-DC-HSDPA, shown by the solid line and closed circles); (2) relative gains with intra-nodeB multi-point communications (discussed above with respect to FIG. 3A, and shown by the dotted line and open circles); and (3) relative gains with inter-nodeB multi-point communications (discussed above with respect to FIG. 3B, and shown by the dotted and dashed line and open squares). As shown, significant gains (up to 23%) may be obtained at relatively low loads using multi-point communications. As loads increase, however, relative gains may diminish because resources available for multi-point communications may decrease.

Figure 8:
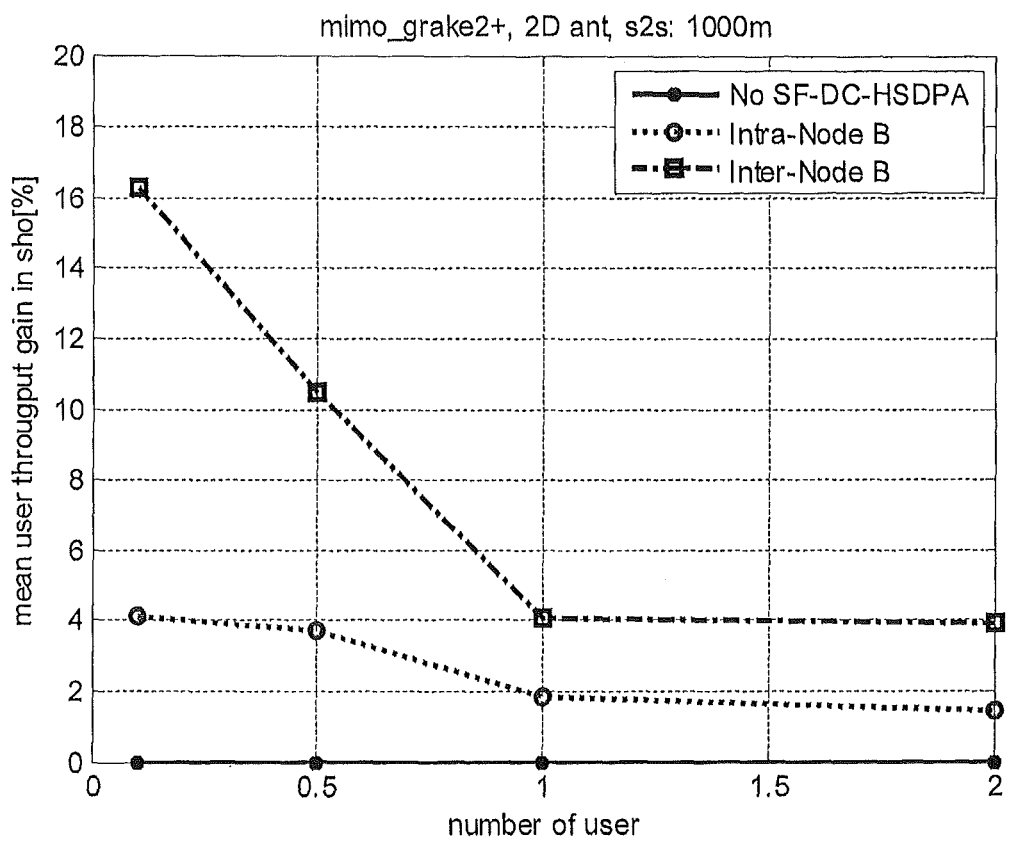
FIG. 8 is a graph illustrating simulated network performance in terms of mean user throughput gains for Rank-1 and rank-2 transmissions according to some embodiments.

FIG. 8 is a graph illustrating relative gains in a in a border area (referred to as a soft handover or sho area) allowing adaptive rank selection (i.e., allowing selection between Rank 1 and Rank 2 precoding vectors) according to channel characteristics. As shown, use of intra-nodeB multi-point communications (shown by the dotted line and open circles) and inter-nodeB multi-point communications (shown by the dotted and dashed line and open squares) may provide gains relative to the baseline without multi-point communications (shown by the solid line and closed circles). As before, the relative gains may diminish with increasing loads, but the gains of FIG. 8 with adaptive rank selection (allowing selection of Rank 2 vectors) may be less than the gains of FIG. 7 where only rank 1 vectors are allowed. FIGS. 7 and 8 thus show that performance may be improved by forcing selection of Rank 1 precoding vectors during multi-point communications according to embodiments of present inventive concepts.

At the Radio Access Network #53 (RAN#53) plenary meeting, a work item on multi-flow HSDPA transmission was started to improve the cell edge user experience. One question that was raised during the Radio Access Network #67 (RAN1#67) meeting is whether to support MIMO for MF-HSDPA or not. It was suggested in R1-114016 ("MIMO in MP-HSDPA", Qualcomm, 3GPP TSG RAN WG1 Meeting #67, San Francisco, USA, 14-18 Nov. 2011) that MF-HSDPA with MIMO enabled may perform worse compared to MF-HSDPA with SIMO (single-input-multiple output) in terms of spectrum efficiency. In R1-114149 ("Performance of Multiflow with single-stream MIMO," Nokia Siemens Networks, Nokia, 3GPP TSG-RAN WG1 Meeting #67, San Francisco, USA, 14-18 Nov. 2011), it was instead suggested that single stream MIMO in MF-HSDPA may be beneficial in terms of system performance. During discussion in RAN1#67 it was suggested that when MIMO operation (single stream) is enabled, the interference structure may become more complex due to the overhead channels and the HS-PDSCH which is precoded. At that time, it was unclear whether MIMO operation gives gain or loss in MF-HSDPA.

As set forth below, simulation results show that MIMO with single stream may provide increased gain compared to that of SIMO enabled MF-HSDPA.

Potential benefits of including the MIMO for MF-HSDPA (vs. SIMO for MF-HSDPA) are outlined below:

1. If SIMO is used for MF-HSDPA UEs, the network may have to switch off the MIMO operation potentially causing significant loss in system throughput and link level throughput to high SNR UEs. From simulation results, loss in average system throughput of 30% due to switching from MIMO to SIMO may occur.
2. Since the MF operation is enabled when the load of the system is less, it is expected that the same UE is scheduled at the same time from two Node-Bs. Hence a type 3i receiver may reduce interference from a neighbor cell(s). Hence, performance may not decline significantly at low load(s).
3. It is expected that as penetration of 4 branch MIMO UEs increases, MF-MIMO operation may provide significant gains.

In the simulations, a uniform loading and 100% penetration of MP-HSDPA capable UEs is assumed. MF operation is triggered when the UE is in soft/softer handover region. The baseline case is taken with single carrier HSDPA with a Type3i receiver with SIMO. Table 1 (provided below) lists parameters used in the system simulations. System level simulation parameters are provided in the tables of FIGS. 17A, 17B, 17C, and 17D.

Simulation results are discussed below, and increases in average user burst rate are quantified for all users and as well as users in soft/softer handover. For each burst, the user burst rate is defined as a ratio between a number of bits transferred in the burst to a duration of the file. Simulated performance results are presented for systems with the following configurations:

SIMO without MF (Baseline)
MIMO (Rank-1 only) without MF
MIMO without MF
SIMO, with MF enabled (intra-site only or both intra- and inter-site)
MIMO (Rank-1 only) with MF enabled
MIMO, with MF enabled (intra-site only or both intra- and inter-site)

Moreover, the simulated results are presented for two traffic conditions, Full buffer and burst traffic.

In the following simulations, $R_{1a}$ and $R_{1b}$ are set equal to 3 and 5 dB respectively, resulting in about 40% of users in soft handover region. For baseline scenarios, all UEs use type 3i receivers and a single link for data transfer. MF operation is available for users in soft/softer handover region who use type 3i receivers.

Figure 9:
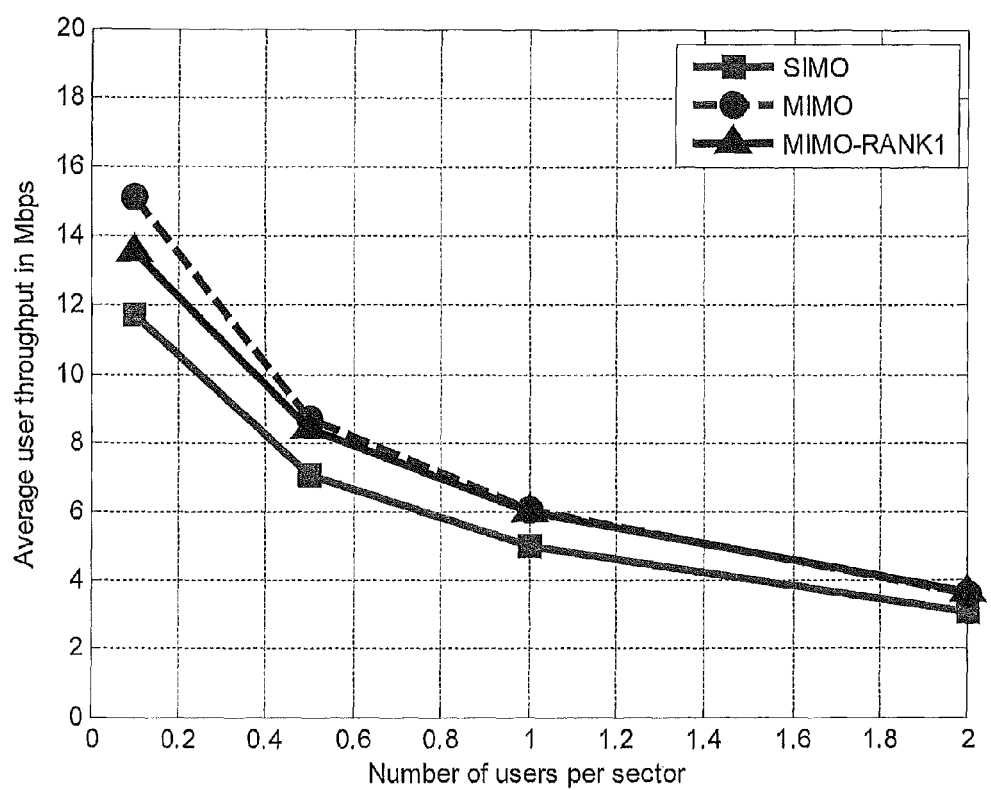
FIG. 9 is a graph illustrating simulated network performance in terms of average user throughput for all wireless terminals (UEs) vs. mean number of users per sector for PA3 channel without MF operation according to some embodiments.

Simulated results with full buffer traffic are discussed below with respect to FIGS. 9-12. FIG. 9 shows the plot between average user throughput for SIMO, MIMO and MIMO with Rank 1 for different number of users per sector for PA3 channel. The throughput is plotted for all the users in Mbps. As shown, MIMO with rank adaptation may outperform SIMO and MIMO with Rank-1 only transmission. FIG.

9 illustrates average user throughput for all the UEs vs. mean number of users per sector for PA3 channel without MF operation.

Figure 10:
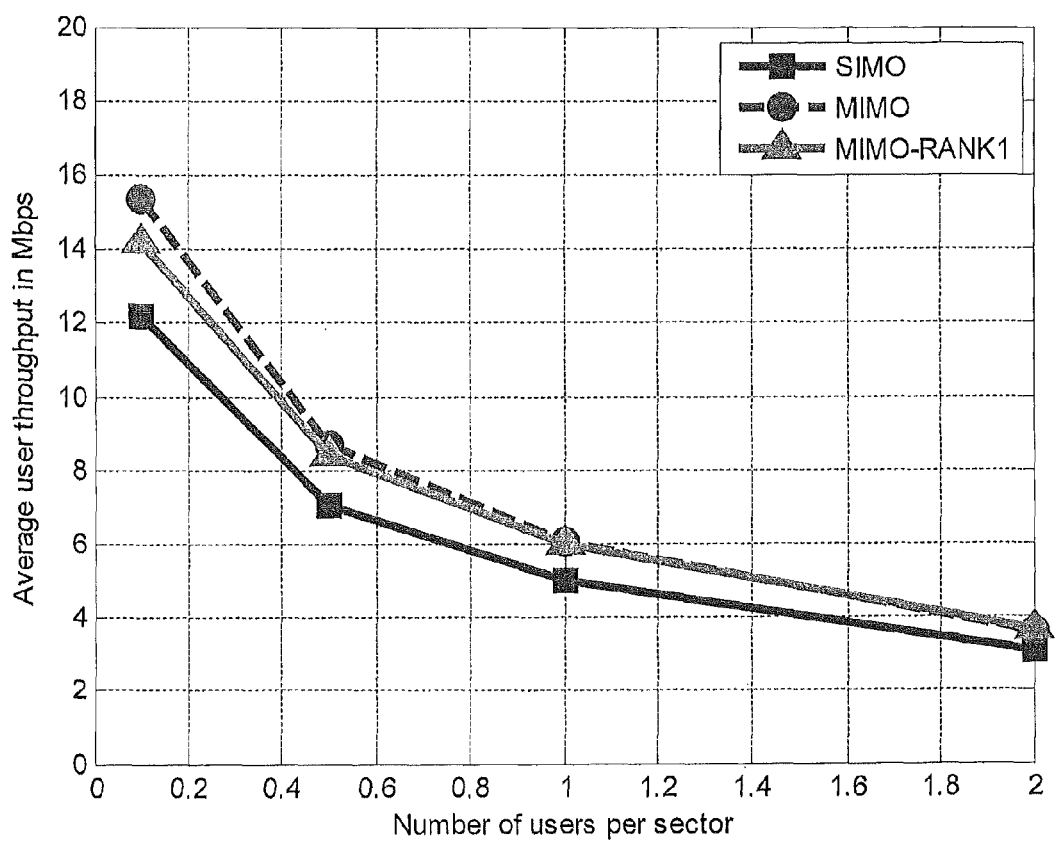
FIG. 10 is a graph illustrating simulated network performance in terms of average user throughput in Mbps for all wireless terminals (UEs) vs. mean number of users per sector with MF operation for PA3 channel according to some embodiments.

FIG. 10 shows the average user throughput for SIMO, MIMO, and MIMO with Rank 1 with MF for all the UEs in Mbps with respect to a number of users in sector for PA3 channel. For all the UEs with MF-operation, MIMO with rank adaptation may still outperform SIMO and MIMO with Rank-1 only transmission. FIG. 10 illustrates average user throughput in Mbps for all the UEs vs. mean number of users per sector with MF operation for PA3 channel.

Figure 11:
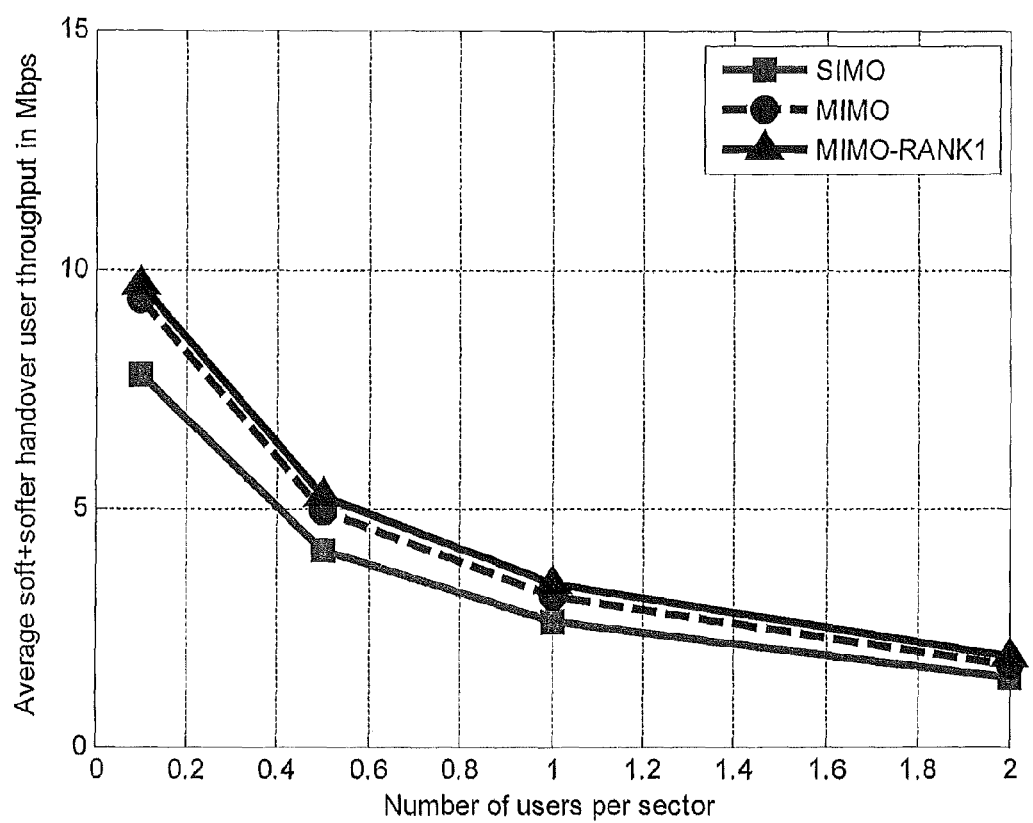
FIG. 11 is a graph illustrating simulated network performance in terms of average user burst rate for soft handover wireless terminals (UEs) vs. mean number of users per sector without MF operation for PA3 channel according to some embodiments.
Figure 12:
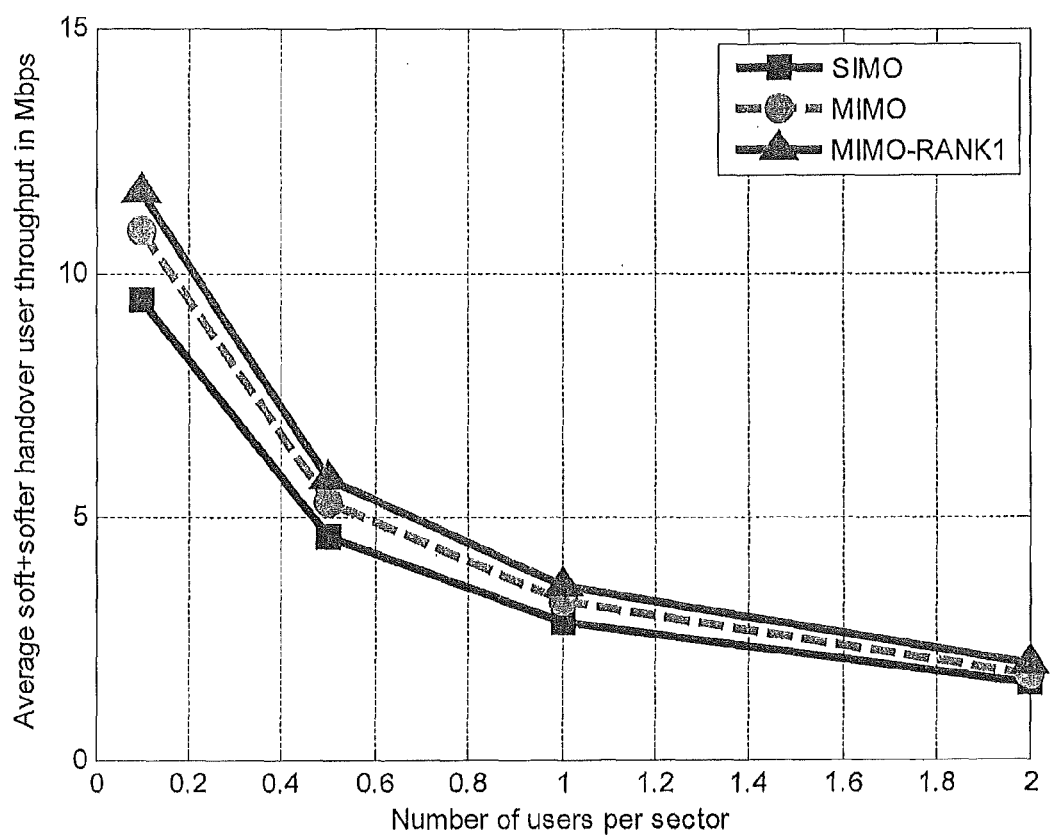
FIG. 12 is a graph illustrating simulated network performance in terms of average user burst rate for soft handover UEs vs. mean number of users per sector with Intra+Inter base station (Node B) MF operation for PA3 channel according to some embodiments.

Softer/Soft handover user throughput numbers for the cases considered without MF operation are shown in FIG. 11. In this case, throughput for MIMO with Rank-1 only transmission and MIMO with Rank adaptation may be similar and there may be insignificant gain using MIMO with rank adaptation. FIG. 12 shows the soft/softer handover user throughput numbers with MF operation. In this case, significant gain may be provided using MIMO with Rank-1 only transmissions. Also observe that gains may decrease as the number of users per sector increases. FIG. 11 illustrates average user burst rate for soft handover UEs vs. mean number of users per sector without MF operation for PA3 channel, FIG. 12 shows average user burst rate for soft handover UEs vs. mean number of users per sector with Intra+Inter Node B MF operation for PA3 channel.

The table of FIG. 18 shows gains achieved using MIMO with rank adaptation and MIMO with Rank-1 only transmission compared with SIMO without MF operation for softer/soft handover users. It can be observed that MIMO with Rank-1 may provide significant gains compared to that of SIMO baseline.

Figure 13:
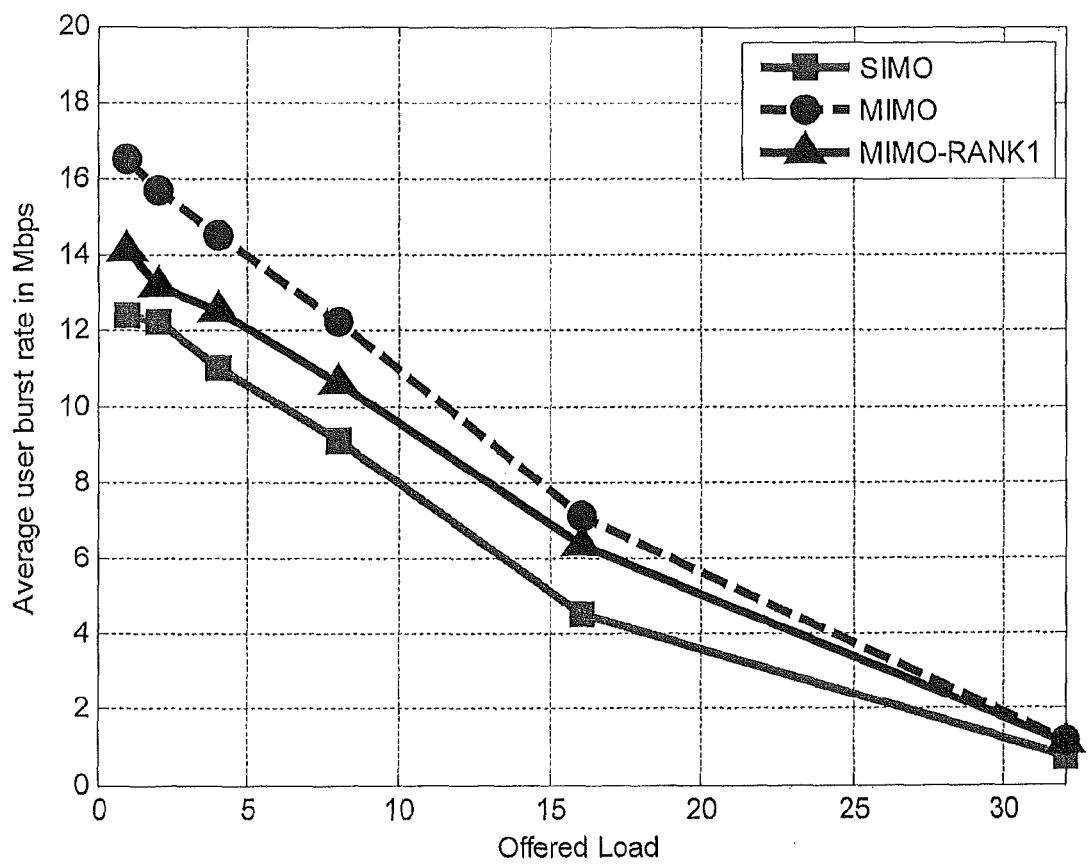
FIG. 13 is a graph illustrating simulated network performance in terms of average burst rate for all the wireless terminals (UEs) with burst traffic without MF operation according to some embodiments.

Simulated results with burst traffic are discussed below with respect to FIGS. 13-16. FIG. 13 shows Average user burst rates for all the UE in the sector vs. offered load in the cell without MF operation. Similar to previous results with full buffer traffic, MIMO with rank adaptation may outperform SIMO and MIMO with Rank-1 only transmission. FIG. 13 shows simulated average burst rates for all UEs with burst traffic without MF operation.

Figure 14:
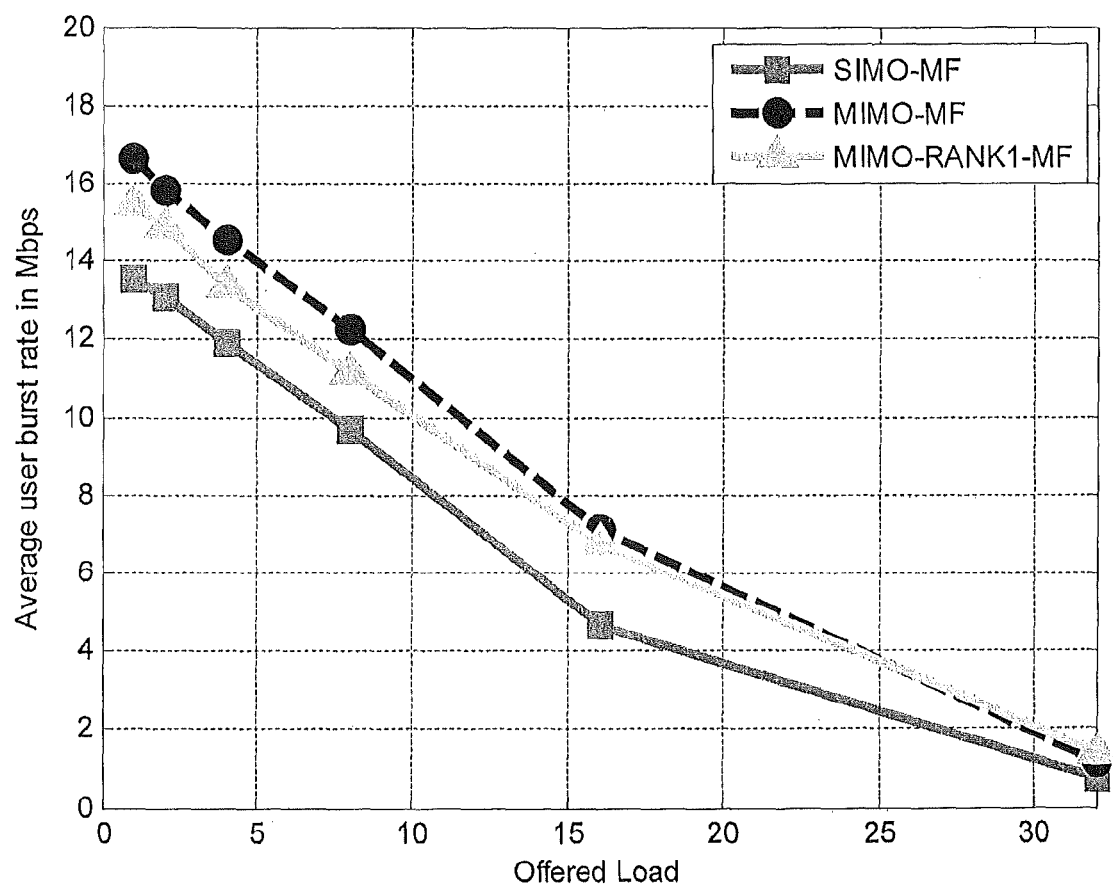
FIG. 14 is a graph illustrating simulated network performance in terms of average burst rate for all the wireless terminals (UEs) with burst traffic with MF operation according to some embodiments.

Simulated average user burst rates with MF operation are shown in FIG. 14. In this case too, MIMO with rank adaptation may outperform MIMO with Rank-1 only transmission and SIMO. FIG. 14 shows simulated average burst rates for all UEs with burst traffic with MF operation.

Figure 15:
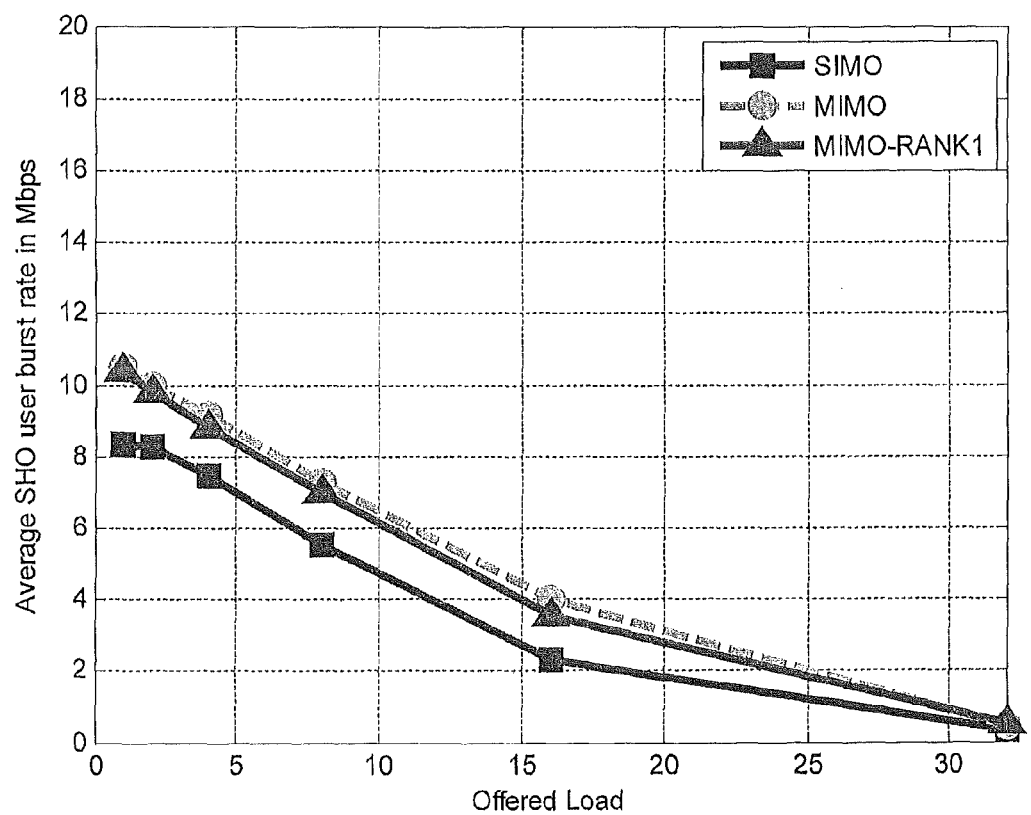
FIG. 15 is a graph illustrating simulated network performance in terms of average burst rate for soft/softer users with burst traffic without MF operation according to some embodiments.
Figure 16:
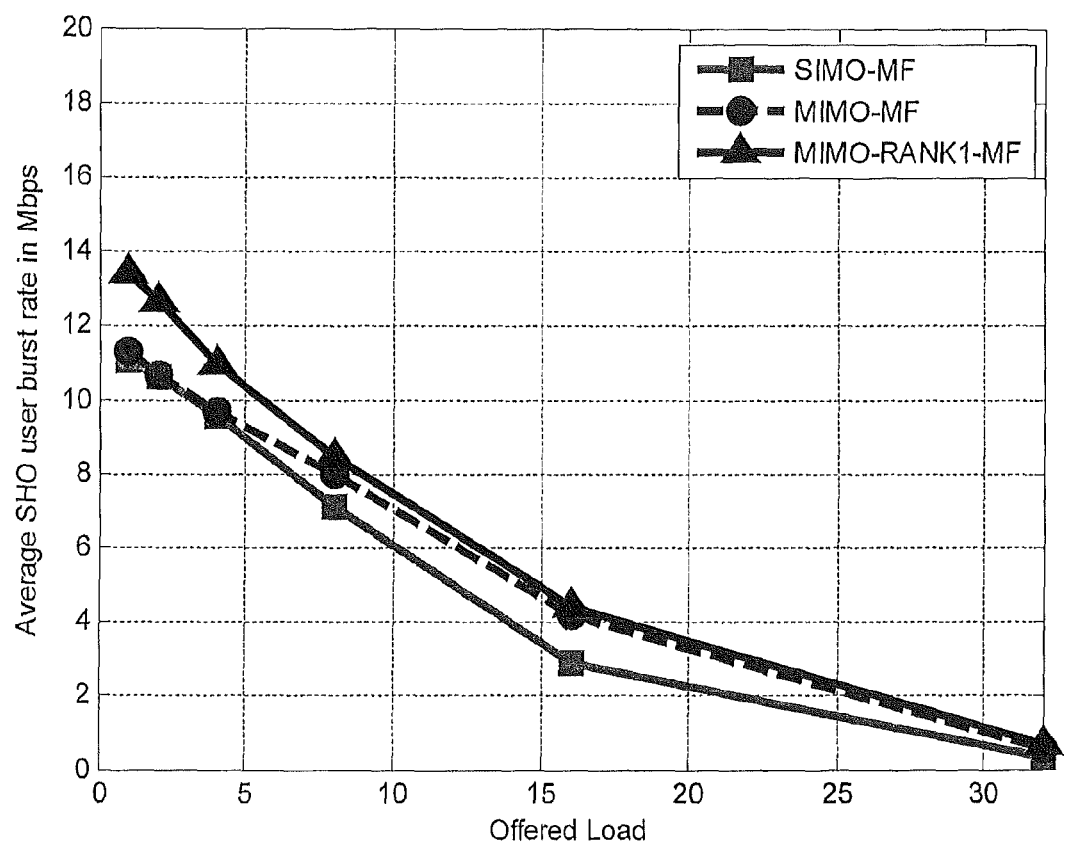
FIG. 16 is a graph illustrating simulated network performance in terms of average burst rate for soft/softer users with burst traffic with MF operation according to some embodiments.

FIG. 15 shows simulated average user burst rates for soft/softer handover users only for the 3 cases considered. Without MF operation, MIMO with rank adaptation and MIMO with Rank 1 only transmission performance may be similar. FIG. 16 shows simulated soft/softer handover user burst rates with MF operation. As shown, MIMO with Rank-1 only transmission may outperform MIMO with rank adaptation and SIMO. Significant gains may thus be achieved at low loads. FIG. 15 shows simulated average burst rate for soft/softer users with burst traffic without MF operation. FIG. 16 shows average burst rate for soft/softer users with burst traffic with MF operation.

According to some embodiments of present inventive concepts, a wireless terminal may receive multiple-input-multiple-output (MIMO) downlink communications from a wireless network including a plurality of base station sector antenna arrays using a codebook of precoding vectors. When receiving the MIMO downlink communications as multi-point MIMO downlink communications from first and second base station sector antenna arrays of the plurality of base station sector antenna arrays, a precoding vector may be selected for the multi-point MIMO downlink communications from only a subset of the precoding vectors of the codebook. Stated in other words, selection of the precoding vector may be restricted to only the subset of the precoding vectors during multi-point downlink communications.

When receiving the MIMO downlink communications as single-point MIMO downlink communications from only one base station sector antenna array, a precoding vector may be selected for the single-point MIMO downlink communications from any of the precoding vectors of the codebook. During single-point MIMO communications, the precoding vector may be selected without restriction.

According to some other embodiments, a wireless communication network including a plurality of base station sector antenna arrays may provide multiple-input-multiple-output (MIMO) downlink communications using a codebook of precoding vectors. A node of the network may transmit MIMO downlink communications from the wireless communication network to a wireless terminal. When transmitting the MIMO downlink communications as multi-point MIMO downlink communications from first and second base station sector antenna arrays of the plurality of base station sector antenna arrays to the wireless terminal, a precoding vector may be selected for the multi-point MIMO downlink communications from only a subset of the precoding vectors of the codebook. Stated in other words, selection of the precoding vector may be restricted to only the subset of the precoding vectors during multi-point downlink communications.

When transmitting the MIMO downlink communications as single-point MIMO downlink communications from only one base station sector antenna array, a precoding vector may be selected for the single-point MIMO downlink communications from any of the precoding vectors of the codebook. During single-point MIMO communications, the precoding vector may be selected without restriction.

According to still other embodiments, a wireless terminal may include an antenna array, a transceiver coupled to the antenna array, and a processor coupled to the transceiver. The antenna array may include a plurality of multiple-input-multiple-output (MIMO) antenna elements, and the transceiver may be configured to receive MIMO downlink communications through the antenna array from at least one of a plurality of base station sector antenna arrays of a wireless network using a codebook of precoding vectors. The processor may be configured to select a precoding vector for downlink communications from only a subset of the precoding vectors of the codebook when receiving the MIMO downlink communications as multi-point MIMO downlink communications from first and second base station sector antenna arrays.

According to yet other embodiments, a wireless communication network node may provide multiple-input-multiple-output (MIMO) downlink communications. The node may include first and second sector antenna arrays for different sectors of the node, with each of the first and second sector antenna arrays including a plurality of MIMO antenna elements. A first transceiver may be coupled to the first sector antenna array, and the first transceiver may be configured to transmit MIMO downlink communications through the first sector antenna array using a codebook of precoding vectors. A second transceiver may be coupled to the second sector antenna array, and the second transceiver may be configured to transmit MIMO downlink communications through the second sector antenna array using the codebook of precoding vectors. A processor may be coupled to the first and second transceivers, and the processor may be configured to transmit MIMO downlink communications through the first and/or second transceivers and the first and/or second sector antenna arrays to a wireless terminal. The processor may be further configured to select a precoding vector from only a subset of the precoding vectors of the codebook when transmitting the MIMO downlink communications to the wireless terminal as multi-point MIMO downlink communications from the first and second sector antenna arrays.

By restricting selection of precoding vectors to only Rank 1 precoding vectors when the wireless terminal is receiving multi-point downlink transmissions from different sector antenna arrays of the radio access network, performance may be improved by preventing spatial multiplexing of downlink transmissions from any sector antenna array to a wireless terminal currently receiving multi-point downlink transmissions. Even though a channel quality between the wireless terminal and a sector antenna arrays providing multi-point downlink transmissions may be of sufficient quality to support spatial multiplexing, such spatial multiplexing may be incompatible with multi-point operations, and selection from only Rank 1 precoding vectors may be forced to prevent such spatial multiplexing from a sector antenna array to a wireless terminal receiving multi-point downlink transmissions. In contrast, any precoding vector of Rank 1 or higher may be selected when the wireless terminal is receiving single-point MIMO downlink transmissions from only one sector antenna array, and spatial multiplexing from a sector antenna array may be allowed for single-point MIMO downlink transmissions.

According to some additional embodiments of present inventive concepts, a wireless terminal may receive multiple-input-multiple-output (MIMO) downlink communications from a wireless network including a plurality of base station sector antenna arrays using a codebook of precoding vectors. Responsive to receiving the MIMO downlink communications as multi-point MIMO downlink communications from first and second base station sector antenna arrays of the plurality of base station sector antenna arrays, a precoding vector may be selected for the multi-point MIMO downlink communications from only a subset of the precoding vectors of the codebook. Stated in other words, selection of the precoding vector may be restricted to only the subset of the precoding vectors during multi-point downlink communications.

Responsive to receiving the MIMO downlink communications as single-point MIMO downlink communications from only one base station sector antenna array, a precoding vector may be selected for the single-point MIMO downlink communications from any of the precoding vectors of the codebook. During single-point MIMO communications, the precoding vector may be selected without restriction.

According to some other embodiments, a wireless communication network including a plurality of base station sector antenna arrays may provide multiple-input-multiple-output (MIMO) downlink communications using a codebook of precoding vectors. A node of the network may transmit MIMO downlink communications from the wireless communication network to a wireless terminal. Responsive to transmitting the MIMO downlink communications as multi-point MIMO downlink communications from first and second base station sector antenna arrays of the plurality of base station sector antenna arrays to the wireless terminal, a precoding vector may be selected for the multi-point MIMO downlink communications from only a subset of the precoding vectors of the codebook. Stated in other words, selection of the precoding vector may be restricted to only the subset of the precoding vectors during multi-point downlink communications.

Responsive to transmitting the MIMO downlink communications as single-point MIMO downlink communications from only one base station sector antenna array, a precoding vector may be selected for the single-point MIMO downlink communications from any of the precoding vectors of the codebook. During single-point MIMO communications, the precoding vector may be selected without restriction.

According to still further embodiments, a wireless terminal may include an antenna array, a transceiver coupled to the antenna array, and a processor coupled to the transceiver. The antenna array may include a plurality of multiple-input-multiple-output (MIMO) antenna elements, and the transceiver may be configured to receive MIMO downlink communications through the antenna array from at least one of a plurality of base station sector antenna arrays of a wireless network using a codebook of precoding vectors. The processor may be configured to select a precoding vector for downlink communications from only a subset of the precoding vectors of the codebook responsive to receiving the MIMO downlink communications as multi-point MIMO downlink communications from first and second base station sector antenna arrays.

According to yet further embodiments, a wireless communication network node may provide multiple-input-multiple-output (MIMO) downlink communications. The node may include first and second sector antenna arrays for different sectors of the node, with each of the first and second sector antenna arrays including a plurality of MIMO antenna elements. A first transceiver may be coupled to the first sector antenna array, and the first transceiver may be configured to transmit MIMO downlink communications through the first sector antenna array using a codebook of precoding vectors. A second transceiver may be coupled to the second sector antenna array, and the second transceiver may be configured to transmit MIMO downlink communications through the second sector antenna array using the codebook of precoding vectors. A processor may be coupled to the first and second transceivers, and the processor may be configured to transmit MIMO downlink communications through the first and/or second transceivers and the first and/or second sector antenna arrays to a wireless terminal. The processor may be further configured to select a precoding vector from only a subset of the precoding vectors of the codebook responsive to transmitting the MIMO downlink communications to the wireless terminal as multi-point MIMO downlink communications from the first and second sector antenna arrays.

Some additional example embodiments are discussed in greater detail below.

Embodiment 1. A method of operating a wireless terminal in a wireless communication network providing multiple-input-multiple-output (MIMO) downlink communications from a plurality of base station sector antenna arrays using a codebook of precoding vectors, the method comprising: receiving MIMO downlink communications from the wireless communication network; and responsive to receiving the MIMO downlink communications as multi-point MIMO downlink communications from first and second base station sector antenna arrays of the plurality of base station sector antenna arrays, selecting a precoding vector for the multi-point MIMO downlink communications from only a subset of the precoding vectors of the codebook.

Embodiment 2. The method of Embodiment 1 further comprising: responsive to receiving the MIMO downlink communications as single-point MIMO downlink communications from only one base station sector antenna array, selecting a precoding vector for the single-point MIMO downlink communications from any of the precoding vectors of the codebook.

Embodiment 3. The method of Embodiment 2 wherein the codebook includes Rank 1 precoding vectors supporting only one layer of MIMO downlink data transmission from a base station sector antenna array and Rank 2 precoding vectors supporting two layers of downlink data transmission from a base station sector antenna array, and wherein the subset of the precoding vectors includes the Rank 1 precoding vectors and excludes the Rank 2 precoding vectors.

Embodiment 4. The method of Embodiment 1 wherein selecting the precoding vector for the multi-point MIMO downlink communication comprises selecting a first precoding vector based on a downlink channel between the wireless terminal and the first base station sector antenna array and selecting a second precoding vector based on a downlink channel between the wireless terminal and the second base station sector antenna array, the method further comprising: transmitting respective first and second identifications of the respective first and second precoding vectors selected for the multi-point MIMO downlink communications.

Embodiment 5. The method of Embodiment 4 further comprising: responsive to receiving the MIMO downlink communications as multi-point MIMO downlink communications, estimating channel characteristics for the downlink channels between the wireless terminal and the first base station sector antenna array and between the wireless terminal and the second base station sector antenna array; responsive to receiving the MIMO downlink communications as multi-point MIMO downlink communications, computing Signal-to-Noise-Ratios, SNRs, for only the subset of the precoding vectors for the downlink channel between the wireless terminal and the first base station sector antenna array and for only the subset of the precoding vectors for the downlink channel between the wireless terminal and the second base station sector antenna array; wherein selecting the first and second precoding vectors comprises selecting the first and second precoding vectors based on the SNRs computed for only the subset of the precoding vectors.

Embodiment 6. A method of operating a node in a wireless communication network, providing multiple-input-multiple-output (MIMO) downlink communications from a plurality of base station sector antenna arrays using a codebook of precoding vectors, the method comprising: transmitting MIMO downlink communications from the wireless communication network to a wireless terminal; and responsive to transmitting the MIMO downlink communications as multi-point MIMO downlink communications from first and second base station sector antenna arrays of the plurality of base station sector antenna arrays to the wireless terminal, selecting a precoding vector for the multi-point MIMO downlink communications from only a subset of the precoding vectors of the codebook.

Embodiment 7. The method of Embodiment 6 further comprising: responsive to transmitting the MIMO downlink communications as single-point MIMO downlink communications from only one base station sector antenna array, selecting a precoding vector for the single-point MIMO downlink communications from any of the precoding vectors of the codebook.

Embodiment 8. The method of Embodiment 7 wherein the codebook includes Rank 1 precoding vectors supporting only one layer of MIMO downlink data transmission from a base station sector antenna array to the wireless terminal and Rank 2 precoding vectors supporting two layers of downlink data transmission from a base station sector antenna array to the wireless terminal, and wherein the subset of the precoding vectors includes the Rank 1 precoding vectors and excludes the Rank 2 precoding vectors.

Embodiment 9. The method of Embodiment 8 further comprising: receiving channel quality information from the wireless terminal wherein the channel quality information includes an identification of a recommended Rank 2 precoding vector of the codebook of precoding vectors; wherein selecting the precoding vector for the multi-point MIMO downlink communications comprises forcing selection of the precoding vector for the multi-point downlink communications from only the subset of the precoding vectors to override the recommended Rank 2 precoding vector.

Embodiment 10. The method of Embodiment 6 wherein selecting the precoding vector for the multi-point MIMO downlink communications comprises selecting a first precoding vector for a downlink channel between the wireless terminal and the first base station sector antenna array and selecting a second precoding vector for a downlink channel between the wireless terminal and the second base station sector antenna array.

Embodiment 11. A wireless terminal comprising: an antenna array including a plurality of multiple-input-multiple-output (MIMO) antenna elements; a transceiver coupled to the antenna array wherein the transceiver is configured to receive MIMO downlink communications through the antenna array from at least one of a plurality of base station sector antenna arrays of a wireless network using a codebook of precoding vectors; and a processor coupled to the transceiver wherein the processor is configured to select a precoding vector for downlink communications from only a subset of the precoding vectors of the codebook responsive to receiving the MIMO downlink communications as multi-point MIMO downlink communications from first and second base station sector antenna arrays.

Embodiment 12. The wireless terminal of Embodiment 11 wherein the processor is further configured to select a precoding vector for downlink communications from any of the precoding vectors of the codebook responsive to receiving the MIMO downlink communications as single-point MIMO downlink communications from only one base station sector antenna array.

Embodiment 13. The wireless terminal of Embodiment 12 wherein the codebook includes Rank 1 precoding vectors supporting only one layer of MIMO downlink data transmission from a base station sector antenna array and Rank 2 precoding vectors supporting two layers of downlink data transmission from a base station sector antenna array, and wherein the subset of the precoding vectors includes the Rank 1 precoding vectors and excludes the Rank 2 precoding vectors.

Embodiment 14. The wireless terminal according to Embodiment 11 wherein the processor is configured to select the precoding vector for the multi-point MIMO downlink communication by selecting a first precoding vector based on a downlink channel between the wireless terminal and the first base station sector antenna array and selecting a second precoding vector based on a downlink channel between the wireless terminal and the second base station sector antenna array, and wherein the processor is configured to transmit respective first and second identifications of the respective first and second precoding vectors through the transceiver and the antenna array.

Embodiment 15. The wireless terminal according to Embodiment 14 wherein the processor is further configured to estimate channel characteristics for the downlink channels between the wireless terminal and the first base station sector antenna array and between the wireless terminal and the second base station sector antenna array responsive to receiving the MIMO downlink communications as multi-point MIMO downlink communications, to compute signal-to-Noise-Ratios, SNRs, for only the subset of the precoding vectors for the downlink channel between the wireless terminal and the first base station sector antenna array and for only the subset of the precoding vectors for the downlink channel between the wireless terminal and the second base station sector antenna array responsive to receiving the MIMO downlink communications as multi-point MIMO downlink communications, and to select the first and second precoding vectors based on the SNRs computed for only the subset of the precoding vectors.

Embodiment 16. A node in a wireless communication network providing multiple-input-multiple-output (MIMO) downlink communications, the node comprising: first and second sector antenna arrays for different sectors of the node wherein each of the first and second sector antenna arrays includes a plurality of MIMO antenna elements; a first transceiver coupled to the first sector antenna array, wherein the first transceiver is configured to transmit MIMO downlink communications through the first sector antenna array using a codebook of precoding vectors; a second transceiver coupled to the second sector antenna array, wherein the second transceiver is configured to transmit MIMO downlink communications through the second sector antenna array using the codebook of precoding vectors; and a processor coupled to the first and second transceivers, wherein the processor is configured to transmit MIMO downlink communications through the first and/or second transceivers and the first and/or second sector antenna arrays to a wireless terminal, and to select a precoding vector from only a subset of the precoding vectors of the codebook responsive to transmitting the MIMO downlink communications to the wireless terminal as multipoint MIMO downlink communications from the first and second sector antenna arrays.

Embodiment 17. The node of Embodiment 16 wherein the processor is configured to select a precoding vector from any of the precoding vectors of the codebook responsive to transmitting the MIMO downlink communications as single-point MIMO downlink communications to the wireless terminal from only one of the first and second sector antenna arrays.

Embodiment 18. The node of Embodiment 17 wherein the codebook includes Rank 1 precoding vectors supporting only one layer of MIMO downlink data transmission from a base station sector antenna array to the wireless terminal and Rank 2 precoding vectors supporting two layers of downlink data transmission from a base station sector antenna array to the wireless terminal, and wherein the subset of the precoding vectors includes the Rank 1 precoding vectors and excludes the Rank 2 precoding vectors.

Embodiment 19. The node of Embodiment 18 wherein the processor is further configured to receive channel quality information from the wireless terminal wherein the channel quality information includes an identification of a recommended Rank 2 precoding vector of the codebook of precoding vectors, and to force selection of the precoding vector for the multi-point downlink communications from only the subset of the precoding vectors to override the recommended Rank 2 precoding vector identified in the channel quality information from the wireless terminal.

Embodiment 20. The node of Embodiment 16 wherein the processor is configured to select the precoding vector by selecting a first precoding vector for a downlink channel between the wireless terminal and the first sector antenna array and selecting a second precoding vector for a downlink channel between the wireless terminal and the second sector antenna array.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

What is claimed is:

1. A method of operating a wireless terminal in a wireless communication network providing multiple-input-multiple-output (MIMO) downlink communications from a plurality of base station sector antenna arrays using a codebook of precoding vectors, the method comprising:
   receiving MIMO downlink communications from the wireless communication network;
   when receiving the MIMO downlink communications as multi-point MIMO downlink communications from first and second base station sector antenna arrays of the plurality of base station sector antenna arrays, selecting a precoding vector for the multi-point MIMO downlink communications from a subset of the precoding vectors of the codebook, wherein selecting the precoding vector for the multi-point MIMO downlink communication comprises selecting a first precoding vector from the subset of the precoding vectors of the codebook based on a first downlink channel between the wireless terminal and the first base station sector antenna array and selecting a second precoding vector from the subset of the precoding vectors of the codebook based on a second downlink channel between the wireless terminal and the second base station sector antenna array; and
   transmitting respective first and second identifications of the respective first and second precoding vectors selected for the multipoint MIMO downlink communication;
   wherein selection of precoding vectors is restricted to the subset of the precoding vectors when receiving the MIMO downlink communications as multi-point MIMO downlink communications;
   wherein the codebook includes Rank 1 precoding vectors supporting one layer of MIMO downlink data transmission from a base station sector antenna array and Rank 2 precoding vectors supporting two layers of downlink data transmission from a base station sector antenna array, and wherein the subset of the precoding vectors includes the Rank 1 precoding vectors and excludes the Rank 2 precoding vectors, wherein selection of precoding vectors is restricted to the Rank 1 precoding vectors when receiving the MIMO downlink communications as multi-point MIMO downlink communications.

2. The method of claim 1 further comprising:
   when receiving the MIMO downlink communications as single-point MIMO downlink communications from only one base station sector antenna array, selecting a precoding vector for the single-point MIMO downlink communications from any of the precoding vectors of the codebook.

3. The method of claim 1 further comprising:
when receiving the MIMO downlink communications as multi-point MIMO downlink communications, estimating channel characteristics for the first downlink channel between the wireless terminal and the first base station sector antenna array and for the second downlink channel between the wireless terminal (200) and the second base station sector antenna array;
when receiving the MIMO downlink communications as multi-point MIMO downlink communications, computing Signal-to-Noise-Ratios, SNRs, for the subset of the precoding vectors for the first downlink channel between the wireless terminal and the first base station sector antenna array and for the subset of the precoding vectors for the second downlink channel between the wireless terminal and the second base station sector antenna array;
wherein selecting the first and second precoding vectors comprises selecting the first and second precoding vectors based on the SNRs computed for the subset of the precoding vectors.

4. A method of operating a node in a wireless communication network providing multiple-input-multiple-output (MIMO) downlink communications from a plurality of base station sector antenna arrays using a codebook of precoding vectors, the method comprising:
transmitting MIMO downlink communications from the wireless communication network to a wireless terminal; and
when transmitting the MIMO downlink communications as multi-point MIMO downlink communications from first and second base station sector antenna arrays of the plurality of base station sector antenna arrays to the wireless terminal, selecting a precoding vector for the multi-point MIMO downlink communications from a subset of the precoding vectors of the codebook wherein selecting the precoding vector comprises selecting the precoding vector at the node;
wherein the codebook includes Rank 1 precoding vectors supporting one layer of MIMO downlink data transmission from a base station sector antenna array to the wireless terminal and Rank 2 precoding vectors supporting two layers of downlink data transmission from a base station sector antenna array to the wireless terminal, and wherein the subset of the precoding vectors includes the Rank 1 precoding vectors and excludes the Rank 2 precoding vectors.

5. The method of claim 4 further comprising:
when transmitting the MIMO downlink communications as single-point MIMO downlink communications from one base station sector antenna array, selecting a precoding vector for the single-point MIMO downlink communications from any of the precoding vectors of the codebook.

6. The method of claim 4, further comprising:
receiving channel quality information from the wireless terminal wherein the channel quality information includes an identification of a recommended Rank 2 precoding vector of the codebook of precoding vectors;
wherein selecting the precoding vector for the multi-point MIMO downlink communications comprises forcing selection of the precoding vector for the multi-point downlink communications from the subset of the precoding vectors to override the recommended Rank 2 precoding vector.

7. The method of claim 4 wherein selecting the precoding vector for the multi-point MIMO downlink communications comprises selecting a firs precoding vector from the subset of the precoding vectors of the codebook for a first downlink channel between the wireless terminal and the first base station sector antenna array and selecting a second precoding vector from the subset of the precoding vectors of the codebook for a second downlink channel between the wireless terminal and the second base station sector antenna array.

8. The method of claim 4 wherein selecting the precoding vector comprises selecting the precoding vector at the node in the wireless communication network providing MIMO downlink communications.

9. A wireless terminal comprising;
an antenna array including a plurality of multiple-input-multiple-output (MIMO) antenna elements;
a transceiver coupled to the antenna array wherein the transceiver is configured to receive MIMO downlink communications through the antenna array from at least one of a plurality of base station sector antenna arrays of a wireless network using a codebook of precoding vectors; and
a processor coupled to the transceiver wherein the processor is configured to select a precoding vector for downlink communications from a subset of the precoding vectors of the codebook when receiving the MIMO downlink communications as multi-point MIMO downlink communications from first and second base station sector antenna arrays, wherein the processor is configured to select the precoding vector for the multi-point MIMO downlink communication by selecting a first precoding vector from the subset of the precoding vectors of the codebook based on a first downlink channel between the wireless terminal and the first base station sector antenna array and selecting a second precoding vector from the subset of the precoding vectors of the codebook based on a second downlink channel between the wireless terminal and the second base station sector antenna array, and wherein the processor is configured to transmit respective first and second identifications of the respective first and second precoding vectors through the transceiver and the antenna array;
wherein selection of precoding vectors is restricted to the subset of the precoding vectors when receiving the MIMO downlink communications as multi-point MIMO downlink communications;
wherein the codebook includes Rank 1 precoding vectors supporting one layer of MIMO downlink data transmission from a base station sector antenna array and Rank 2 precoding vectors supporting two layers of downlink data transmission from a base station sector antenna array, wherein the subset of the precoding vectors includes the Rank 1 precoding vectors and excludes the Rank 2 precoding vectors and wherein selection of precoding vectors is restricted to the Rank 1 precoding vectors when receiving the MIMO downlink communications as multi-point MIMO downlink communications.

10. The wireless terminal of claim 9 wherein the processor is further configured to select a precoding vector for downlink communications from any of the precoding vectors of the codebook when receiving the MIMO downlink communications as single-point MIMO downlink communications from only one base station-sector antenna array.

11. The wireless terminal of claim 9, wherein the codebook includes Rank 1 precoding vectors supporting one layer of MIMO downlink data transmission from a base station sector antenna array and Rank 2 precoding vectors supporting two layers of downlink data transmission from a base station sector antenna array, and wherein the subset of the precoding vectors includes the Rank 1 precoding vectors and excludes the Rank 2 precoding vectors, wherein selection precoding vectors is restricted to the rank precoding vectors when receiving the MIMO downlink communications as multi-point MIMO downlink communications.

12. The wireless terminal according to claim 9 wherein the processor is further configured to estimate channel characteristics for the first downlink channel between the wireless terminal and the first base station sector antenna array and for the second downlink channel between the wireless terminal and the second base station sector antenna array when receiving the MIMO downlink communications as multi-point MIMO downlink communications, to compute signal-to-Noise-Ratios, SNRs, for the subset of the precoding vectors for the first downlink channel between the wireless terminal and the first base station sector antenna array and for the subset of the precoding vectors for the second downlink channel between the wireless terminal and the second base station sector antenna array when receiving the MIMO downlink communications as multi-point MIMO downlink communications, and to select the first and second precoding vectors based on the SNRs computed for the subset of the precoding vectors.

13. A node in a wireless communication network providing multiple-input-multiple-output (MIMO) downlink communications, the node comprising;
   first and second sector antenna arrays for different sectors of the node wherein each of the first and second sector antenna arrays includes a plurality of MIMO antenna elements;
   a first transceiver coupled to the first sector antenna array, wherein the first transceiver is configured to transmit MIMO downlink communications through the first sector antenna array using a codebook of precoding vectors;
   a second transceiver coupled to the second sector antenna array, wherein the second transceiver is configured to transmit MIMO downlink communications through the second sector antenna array using the codebook of precoding vectors; and
   a processor coupled to the first and second transceivers, wherein the processor is configured to transmit MIMO downlink communications through the first and/or second transceivers and the first and/or second sector antenna arrays to a wireless terminal, and to select a precoding vector from a subset of the precoding vectors of the codebook when transmitting the MIMO downlink communications to the wireless terminal as multi-point MIMO downlink communications from the first and second sector antenna arrays;
   wherein the codebook includes Rank 1 precoding vectors supporting one layer of MIMO downlink data transmission from a base station, sector antenna array to the wireless terminal and Rank 2 precoding vectors supporting two layers of downlink data transmission from a base station sector antenna array to the wireless terminal, and wherein the subset of the precoding vectors includes Rank 1 precoding vectors and excludes the Rank 2 precoding vectors.

14. The node of claim 13 wherein the processor is configured to select a precoding vector from any of the precoding vectors of the codebook when transmitting the MIMO downlink communications as single-point MIMO downlink communications to the wireless terminal from only one of the first and second sector antenna arrays.

15. The node of claim 13, wherein the processor is further configured to receive channel quality information from the wireless terminal wherein the channel quality information includes an identification of a recommended Rank 2 precoding vector of the codebook of precoding vectors, and to force selection of the precoding vector for the multi-point downlink communications from the subset of the precoding vectors to override the recommended Rank 2 precoding vector identified in the channel quality information from the wireless terminal.

16. The node of claim 13 wherein the processor is configured to select the precoding vector by selecting a first precoding vector from the subset of the precoding vectors of the codebook for a first downlink channel between the wireless terminal and the first sector antenna array and selecting a second precoding vector from the subset of the precoding vectors of the codebook for a second downlink channel between the wireless terminal and the second sector antenna array.

* * * * *

UNITED STATES PATENT AND TRADEMARK OFFICE
CERTIFICATE OF CORRECTION

| | | |
|---|---|---|
| PATENT NO. | : 9,065,494 B2 | Page 1 of 1 |
| APPLICATION NO. | : 13/818161 | |
| DATED | : June 23, 2015 | |
| INVENTOR(S) | : Nammi et al. | |

It is certified that error appears in the above-identified patent and that said Letters Patent is hereby corrected as shown below:

Specification

In Column 7, Line 58, delete "RCN 121" and insert -- RNC 121 --, therefor.

In Column 8, Line 26, delete "more that" and insert -- more than --, therefor.

In Column 15, Line 1, delete "200, In" and insert -- 200. In --, therefor.

In Column 21, Line 23, delete "channel, FIG. 12" and insert -- channel. FIG. 12 --, therefor.

Claims

In Column 33, Line 9, in Claim 11, delete "rank" and insert -- rank 1 --, therefor.

In Column 33, Line 32, in Claim 13, delete "comprising;" and insert -- comprising: --, therefor.

Signed and Sealed this
Twenty-third Day of February, 2016

Michelle K. Lee
*Director of the United States Patent and Trademark Office*